(12) United States Patent
Bellissima et al.

(10) Patent No.: US 10,621,683 B2
(45) Date of Patent: Apr. 14, 2020

(54) CONTROL DEVICE FOR OPTIMIZING LOCAL ENERGY NETWORK

(71) Applicants: YANMAR Co., Ltd., Osaka (JP); ENEL PRODUZIONE S.P.A., Rome (IT)

(72) Inventors: Alessandro Bellissima, Florence (IT); Sandro Magnani, Florence (IT); Mirko Andreini, Florence (IT); Giovanni Ferrara, Florence (IT); Fabio Esposito, Florence (IT); Lorenzo Ferrari, Sesto Fiorentino (IT); Massimo Pentolini, Trezzano sul Naviglio (IT); Marcello De Chirico, Trezzano sul Naviglio (IT); Giacomo Petretto, Rome (IT); Matteo Cantu, Rome (IT); Sandra Scalari, Rome (IT); Gianluca Gigliucci, Rome (IT)

(73) Assignee: YANMAR CO., LTD., Osaka (JP)

( * ) Notice: Subject to any disclaimer, the term of this patent is extended or adjusted under 35 U.S.C. 154(b) by 338 days.

(21) Appl. No.: 15/522,101

(22) PCT Filed: Nov. 5, 2014

(86) PCT No.: PCT/IT2014/000288
§ 371 (c)(1),
(2) Date: Apr. 26, 2017

(87) PCT Pub. No.: WO2016/071930
PCT Pub. Date: May 12, 2016

(65) Prior Publication Data
US 2018/0322591 A1    Nov. 8, 2018

(51) Int. Cl.
*G06Q 50/06* (2012.01)
*G06N 3/12* (2006.01)
(Continued)

(52) U.S. Cl.
CPC .......... *G06Q 50/06* (2013.01); *G06N 3/126* (2013.01); *H02J 3/14* (2013.01);
(Continued)

(58) Field of Classification Search
CPC .......... G06Q 50/06; G06N 3/126; Y02P 80/11
(Continued)

(56) References Cited

U.S. PATENT DOCUMENTS

| | | | |
|---|---|---|---|
| 6,757,591 B2 | 6/2004 | Kramer | |
| 7,127,327 B1* | 10/2006 | O'Donnell | ............... G05F 1/66 700/286 |
| 2014/0257584 A1* | 9/2014 | Tanimoto | ............... G06Q 50/06 700/291 |

OTHER PUBLICATIONS

Larsen et. al. ("Distributed Control of the Power Supply-Demand Balance", IEEE Transactions on Smart Grid vol. 4, No. 2, 828, 836 (Jun. 2013) (Year: 2013).*

(Continued)

*Primary Examiner* — Kevin H Flynn
*Assistant Examiner* — Emmett K. Walsh
(74) *Attorney, Agent, or Firm* — Norton Rose Fulbright US LLP

(57) ABSTRACT

Disclosed is a control device capable of reducing $CO_2$ emission and primary energy consumption, as well as energy supply cost, to lowest possible levels in optimal energy management. In repeatedly generating two or more energy balance candidates for each unit time for the outputs of the electric power grid and thermal accumulation unit based on combinations of varied values of the output ratios of a CHP, an RES, a thermal energy supply system, and an electrical storage unit and the consumption ratios of electric and thermal loads until the convergence of the evaluation values of the two or more candidates reaches a convergence criterion.

20 Claims, 11 Drawing Sheets

(51) Int. Cl.
*H02J 3/14* (2006.01)
*H02J 3/00* (2006.01)

(52) U.S. Cl.
CPC ... *H02J 2003/003* (2013.01); *H02J 2003/143* (2013.01); *Y02B 70/3225* (2013.01); *Y02B 70/3266* (2013.01); *Y02P 80/11* (2015.11); *Y04S 20/222* (2013.01); *Y04S 20/242* (2013.01)

(58) Field of Classification Search
USPC .......................................................... 705/412
See application file for complete search history.

(56) References Cited

OTHER PUBLICATIONS

Larsen et. al., "Distributed Control of the Power Supply-Demand Balance", IEEE Transactions on Smart Grid, vol. 4, No. 2, 828, 836 (Year: 2013).*
International Search Report and Written Opinion dated Jul. 20, 2015 for Application No. PCT/IT2014/000288.
Arabali et al article, "Genetic-Algorithm-Based Optimization Approach for Energy Management" IEEE Transactions Power Delivery, vol. 28, No. 1, Jan. 2013, pp. 162-170.
Faisal et al article, "Online Management Genetic Algorithms of Microgrid for Residential Application" Energy Conversion and Management, vol. 64 (2012), pp. 562-568.

* cited by examiner (Mutation Operation)

CONTROL DEVICE FOR OPTIMIZING LOCAL ENERGY NETWORK

TECHNICAL FIELD

The present invention relates in general to control devices for optimizing energy management for a local energy network by exploiting both electric and thermal energy in such a manner as to achieve desirable overall performance and in particular to control devices for an electric and thermal energy network that are applicable to residential facilities and industrial utilities (plants) for which it is desirable to reduce energy supply cost, $CO_2$ (carbon dioxide) emission, and primary energy consumption.

BACKGROUND ART

An electric and thermal energy network that exploits both electric and thermal energy for desirable overall performance connects, for example, a combined heat and power system (CHP) (e.g., a gas-powered electric generator), a renewable energy source (RES) (e.g., a photovoltaic device and a wind-powered electric generator), an electric storage unit (e.g., one that includes a rechargeable battery), a thermal accumulation unit (e.g., one that includes a heating storage device or a cooling storage device), an electric power grid (electric power supply network) (e.g., a commercial electric power system), a thermal energy supply system (e.g., a gas boiler, an electric cooling device, an absorption cooling device), an electric load (e.g., a server device), and a thermal load (e.g., a room heating device).

Such an electric and thermal energy network exhibits low energy supply efficiency, hence high energy supply cost unless, for example, CHPs are managed in accordance with various conditions either in thermal power-led operation, in which the CHP follows thermal power demand, or in electric power-led operation, in which the CHP follows electric power demand, so as to achieve an effective combination of energy supply efficiency and energy supply cost. Unless the CHPs are thus managed, optimally efficient management and optimal energy management would be impossible.

In relation to this inconvenience, Patent Document 1 discloses an energy management system that minimizes energy cost by fuzzy logic when both electric and thermal energy are exploited for desirable overall performance by balancing energy supplies from an electric power grid, CHPs, and RES's and energy demands by electric and thermal loads.

On the same note, Patent Document 2 discloses an energy control system that uses fuzzy logic to determine, among other factors, at what power level to operate each distributed generator and when to store energy.

CITATION LIST

Patent Literature

Patent Document 1: U.S. Pat. No. 6,757,591
Patent Document 2: U.S. Pat. No. 7,127,327

SUMMARY OF THE INVENTION

Problems to be Solved by the Invention

In optimal energy management for an electric and thermal energy network, it is a critical issue to reduce $CO_2$ emission and primary energy consumption, as well as energy supply cost, to lowest possible levels.

The systems of Patent Documents 1 and 2, however, do not reduce $CO_2$ emission and primary energy consumption, as well as energy supply cost, to lowest possible levels in optimal energy management.

Accordingly, the present invention has an object to provide a control device for an electric and thermal energy network connecting combined heat and power systems (CHPs), renewable energy sources (RES's), electric storage units, thermal accumulation units, an electric power grid, thermal energy supply systems, electric loads, and thermal loads, the control device being capable of reducing $CO_2$ emission and primary energy consumption, as well as energy supply cost, to lowest possible levels in optimal energy management.

Examples of technologies related to the present invention include:

Bermal-Augustin et al. propose use of a genetic modified algorithm as an optimization algorithm to optimize the operation of a hybrid electric energy system (PVs (photovoltaics), diesel engines, batteries, and loads) in their paper, "Multi-objective design and control of hybrid systems minimizing costs and unmet load."

Wang et al. propose in their paper, "Optimization of capacity and operation for CCHP system by genetic algorithm," to optimize the scheduling of a CCHP system only in a district area.

In the paper, "Multi-objective optimization for the operation of distributed energy systems considering economic and environmental aspects," Ran et al. propose to use an MILD (Mixed-Integer Linear Programming) algorithm to optimize the scheduling of distributed electric and thermal generators to satisfy the loads of a district area, considering as objective functions the total energy cost and the pollutant ($CO_2$) emission.

Zhou et al., in their paper, "Economic assessment of a distributed energy system in a new residential area with existing grid coverage in China," propose optimized management of electric and thermal energy generators for a district area to match the load requirements based on MINLP (Mixed-Integer Non-Linear Programming).

The papers, "Optimum residential load management strategy for real time pricing. (RTP) demand response programs," by Lujano-Rojas et al. and "Real-time scheduling of deferrable electric loads" by Subramanian et al. propose different strategies for the effective management of the electric loads to minimize energy coat in a district area.

In summary, most conventional algorithms are analytical (MILP, MINLP, etc.), requiring much labor for their implementation and large computational resources during their operation, with a limited flexibility in terms of equipment that can be run without huge modification.

Technologies in the field of energy management that use software with a specific algorithm include the following examples:

Schneider Electric's "Power Logic Energy Box" is an electricity monitoring system which analyzes acquired data and gives indication on consumption and diagnostics.

"Spectrum Power 4" of Siemens is an electric energy management system for distributed power plants, allowing scheduling of all generators for an efficient global management. "DENS" of the same company is a scheduler for distributed power plants, considering weather forecasts, energy prices, technical constraints of the plants, and the presence of electric storages.

GE's "Grid IQ™ Microgrid Control System" is an optimizer for electric micro-grids allowing economical operation of the grids by acting on the power output of distributed generators. "U90 Plus" of the same company, similarly to Grid IQ, is a micro-grid power supply capable of managing also RES's, heat pumps, and electric storages.

ABB's "Pro DMS" is a distributed network management system for small and large electric power companies, allowing optimized scheduling of power plants.

DONG Energy's "Power Hub" is an electric energy manager, optimizing power generation from both renewable and fossil energy sources.

As detailed so far, there exist technologies related to the present invention, none of which discloses the present invention.

Solution to Problem

The present invention, to address the problems above, is a control device for an electric and thermal energy network connecting a combined heat and power system (CHP), a renewable energy source (RES), an electric storage unit, a thermal accumulation unit, an electric power grid, a thermal energy supply system, an electric load, and a thermal load, the control device including:

input means receiving a forecast energy demand, a unit energy price, and a forecast weather condition for a geographical region covered by the electric and thermal energy network;

computing means repeatedly generating two or more energy balance candidates for each unit time for an output of the electric power grid and an output of the thermal accumulation unit based on combinations of varied values of an output ratio of the CHP, an output ratio of the RES, an output ratio of the thermal energy supply system, an output ratio of the electric storage unit, a consumption ratio of the electric load, and a consumption ratio of the thermal load, until convergence of evaluation values of the two or more candidates reaches a predetermined convergence criterion; and output means transmitting, to the CHP, the RES, the thermal energy supply system, the electric storage unit, the electric load, and the thermal load, respective operational instructions for each unit time to instruct the CHP, the RES, the thermal energy supply system, the electric storage unit, the electric load, and the thermal load, wherein the computing means implements:

a first calculation process in which the computing means calculates an output of the CHP from a rated output of the CHP and the output ratio of the CHP calculates an output of the RES from a maximum output of the RES and the output ratio of the RES, the maximum output being based on a weather condition, calculates an output of the thermal energy supply system from a rated output of the thermal energy supply system and the output ratio of the thermal energy supply system, calculates an output of the electric storage unit from a maximum output of the electric storage unit and the output ratio of the electric storage unit, the maximum output being based on the state of charge, calculates an energy consumption of the electric load from a rated power consumption of the electric load and the consumption ratio of the electric load, and calculates an energy consumption of the thermal load from a rated power consumption of the thermal load and the consumption ratio of the thermal load;

a second calculation process in which the computing means calculates a difference between a sum of the output of the CHP, the output of the RES, the output of the thermal energy supply system, the output of the electric storage unit, and energy that can be supplied from the thermal accumulation unit and a sum of an uninterruptible energy consumption for energy demand, the energy consumption of the electric load, and the energy consumption of the thermal load as the output of the electric power grid and the output of the thermal accumulation unit;

an evaluation process in which the computing means plugs in energy supply costs, $CO_2$ emissions, and primary energy consumptions into an evaluation criterion to evaluate the two or more energy balance candidates for each unit time, the energy supply costs being based on the unit energy price; and a selection process in which the computing means selects, from the two or more energy balance candidates for each unit time, a most positive evaluation candidate that is most positively evaluated when the convergence of the evaluation values of the two or more candidates has reached the convergence criterion, wherein the output means transmits respective operational instructions for each unit time based on the most positive evaluation candidate to the CHP, the RES, the thermal energy supply system, the electric storage unit, the electric load, and the thermal load.

In this context, primary energy is the energy directly obtainable from natural resources, like fossil fuels (e.g., coal, crude oil, and natural gas), hydraulic power, solar and geothermal power, and uranium and expressed in kWh.

In one of aspects of the present invention, the computing means codes the output ratio of the CHP, the output ratio of the RES, the output ratio of the thermal energy supply system, the output ratio of the electric storage unit, the consumption ratio of the electric load, and the consumption ratio of the thermal load into a chromosome containing a predetermined number of genes, codes the two or more candidates into individuals, and repeatedly generates two or more individuals based on a genetic algorithm.

In one of aspects of the present invention, the electric and thermal loads are classified into four categories L1 to L4:

L1: non-adjustable loads that consume the uninterruptible energy consumption for energy demand, L2: interruptible and adjustable loads, L3: manageable loads that are not allowed to discontinue their operation until a total operation time is reached once they start to operate, and L4: manageable loads that are, after starting to operate, allowed to discontinue their operation if a total operation time is reached within a predetermined period of time (e.g., within that day).

In one of aspects of the present invention, the input means further receives an electric power exchange profile of the electric power grid as an energy demand; and the computing means uses matching between the output of the electric power grid and the electric power exchange profile as an additional evaluation criterion.

Advantageous Effects of the Invention

The present invention is capable of reducing $CO_2$ emission and primary energy consumption, as well as energy supply cost, to lowest possible levels in optimal energy management.

DESCRIPTION OF EMBODIMENTS

The following will describe embodiments in accordance with the present invention in reference to drawings.

Electric Power Grid

Figure 1:
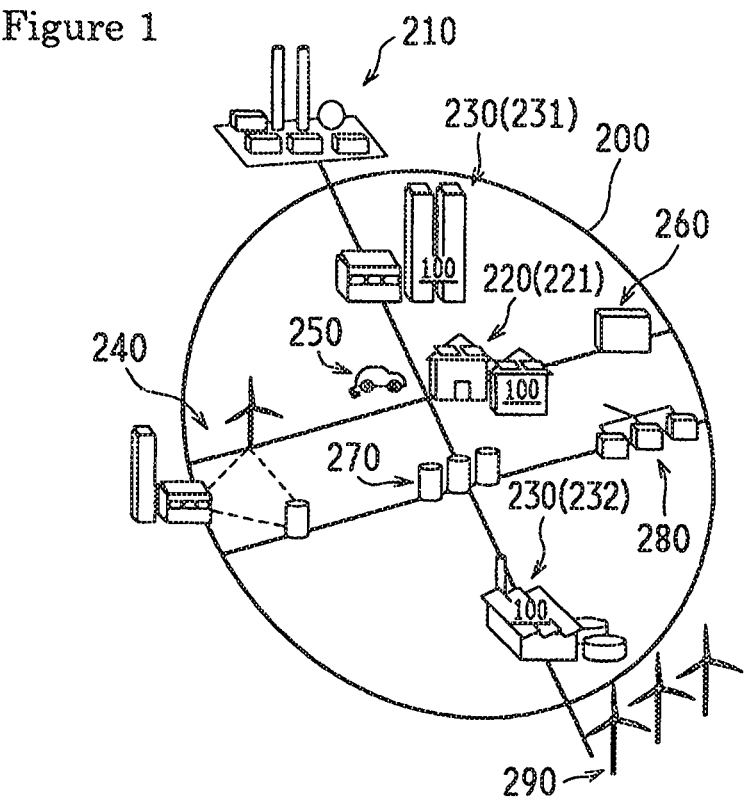
FIG. 1 is a schematic illustration of an exemplary electric power grid connected to an electric and thermal energy network in accordance with an embodiment of the present invention.

FIG. 1 is a schematic illustration of an exemplary electric power grid 200 to which is connected an electric and thermal energy network 100 in accordance with an embodiment of the present invention.

The electric power grid 200 is a large-scale commercial electric power system operating as a smart energy network (smart grid). A smart energy network enables exchange of electric power supply/demand information and also of various electric power-related information between an electric power supplier, such as an electric power company, and an electric power consumer, such as residential facilities (e.g., general households) and industrial utilities (e.g., factories and commercial buildings) by using information communications technology.

In the example shown in FIG. 1, the electric power grid 200 connects a central power plant 210, general households 221 as residential facilities 220, offices 231 and factories 232 as industrial utilities 230, a small-scale wind power plant 240, electric vehicles 250, a combined heat and power system (CHP) 260, an electric storage unit 270, fuel cells 280, and a large-scale wind-powered plant 290 in such a manner as to enable exchange of electric power supply/demand information and various electric power-related information between the electric power supplier and the electric power consumer.

The residential facilities 220 and/or the industrial utilities 230 (the residential facilities 220 and the industrial utilities 230 in the example shown in FIG. 1) may include an electric and thermal energy network 100.

Electric and Thermal Energy Net

Figure 2:
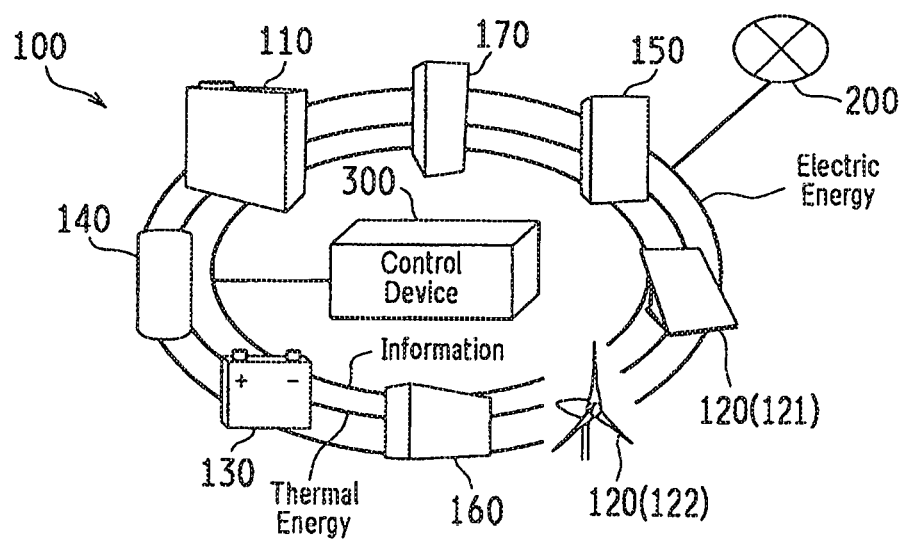
FIG. 2 is a schematic illustration of an exemplary electric and thermal energy network in accordance with an embodiment of the present invention.
Figure 3:
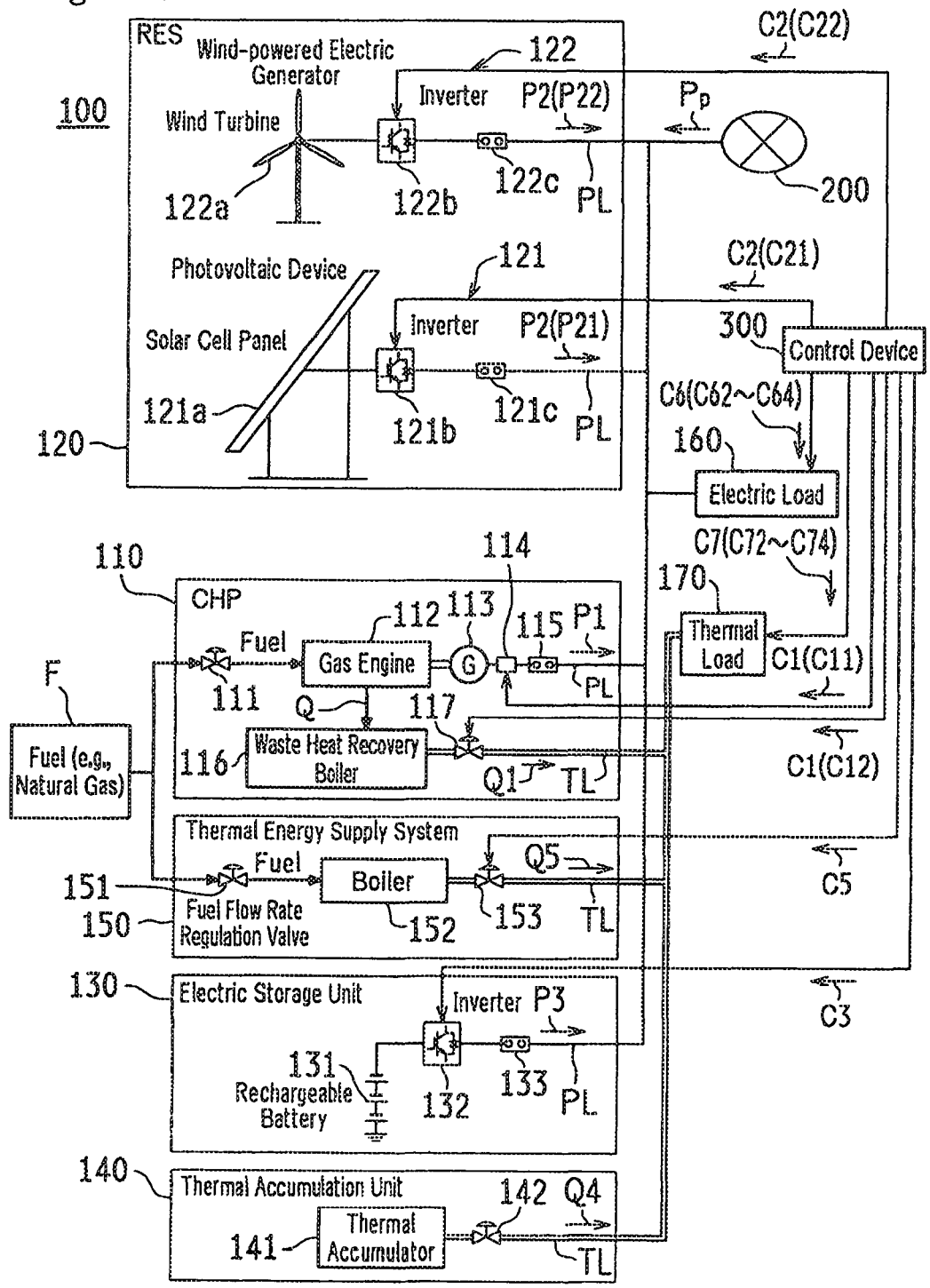
FIG. 3 is a schematic block diagram illustrating in detail the electric and thermal energy network shown in FIG. 2.

FIG. 2 is a schematic illustration of an exemplary electric and thermal energy network 100 in accordance with an embodiment of the present invention. FIG. 3 is a schematic block diagram illustrating in detail the electric and thermal energy network 100 shown in FIG. 2.

As illustrated in FIGS. 2 and 3, the electric and thermal energy network 100 is applicable to the residential facilities 220 and/or the industrial utilities 230 and operates as a local energy network that exploits both electric and thermal energy for desirable overall performance.

The electric and thermal energy network 100 connects a combined heat and power system (CHP) 110, a renewable energy source (RES) 120, an electric storage unit 130, a thermal accumulation unit 140, the electric power grid 200, a thermal energy supply system 150, an electric load 160, and a thermal load 170. Under the control of the control device 300, the electric and thermal energy network 100 operates the operation of the CHP 110, the RES 120, the thermal energy supply system 150, the electric storage 130, the electric load 160, and the thermal load 170.

As illustrated in FIG. 3, the CHP HO is a gas-powered electric generator in the present embodiment. The CHP 110 includes an open/close valve 111, a gas engine 112, an electric power generator 113, an electric power converter 114 for the electric power generator 113, an AC circuit breaker 115, a waste heat recovery boiler 116, and an adjusting valve 117.

In the CHP 110, the gas engine 112 runs on the fuel supplied from a fuel supply source via the open/close valve 111. The rotation of the gas engine 112 drives the electric power generator 113 for power generation. The generated electric energy P1 is fed to an electric power supply line PL via the AC circuit breaker 115. Also in the CHP 110, the heat (waste heat) Q generated by the gas engine 112 heats up the waste heat recovery boiler 116. The thermal energy Q1 of the obtained water vapor or hot water is fed to a heat supply line TL.

The CHP 110 is connected to an output system of the control device 300 so that it can change its outputs (electric energy P1 and thermal energy Q1) in response to operational instructions C1 from the control device 300 (i.e., an operational instruction on the output ratio R1 (R11) with respect to the rated electric energy output, specifically an operational instruction C11 on the duty ratio of a switching element in the electric power converter 114, and an operational instruction on the output ratio R1 (R12) with respect to the rated thermal energy output, specifically an operational instruction C12 on the opening of the adjusting valve 117 disposed on the heat supply line TL of the waste heat recovery boiler 116). As an example, for a rated electric energy output of 10 kWh and an output ratio R1 (R11) of 50%, the CHP 110 operates generating an electric energy P1 of 5 kWh in response to an input from the control device 300 of an operational instruction ell dictating that the output ratio R1 (R11) with respect to the 10-kWh rated electric energy output be 50%. In addition, for a rated thermal energy output of 36,000 kJ and an output ratio R1 (R12) of 50%, the CHP 110 operates generating a thermal energy Q1 of 18,000 kJ in response to an input from the control device 300 of an operational instruction C12 dictating that the output ratio R1 (R12) with respect to the 36,000-kJ rated thermal energy output be 50%.

The RES 120 runs on natural energy to output electric energy and is connected to the output system of the control device 300. The RES 120 can change its output in response to an operational instruction C2 from the control device 300 (i.e., an operational instruction on the output ratio R2 with respect to a maximum output) because the output of the RES 120 may need to be restricted to maintain predetermined electric power demand levels for the electric power grid 200 (e.g., the electric power exchange profile described later in detail).

The RES 120 includes a photovoltaic device 121 and a wind-powered electric generator 122 in the present embodiment.

The photovoltaic device 121 includes a solar cell panel 121a, a photovoltaic cell-use inverter 121b, and an AC circuit breaker 121c. In the photovoltaic device 121, the solar cell panel 121a generates electric power under sunlight. The generated electric power is converted to AC electric energy P2 (P21) by the photovoltaic cell-use inverter 121b. The converted electric energy P2 (P21) is fed to the electric power supply line PL via the AC circuit breaker 121c. The photovoltaic device 121 is connected to the output system of the control device 300 so that it can change its output (electric energy P21) in response to an operational instruction C2 (C21) from the control device 300 (i.e., an operational instruction on the output ratio R2 (R21) with respect to the maximum output of the solar cell panel 121a that depends on the intensity of sunlight, specifically an operational instruction on the duty ratio of a switching element in the photovoltaic cell-use inverter 121b). As an example, where the solar cell panel 121a has a rated output of 10 kWh, but the solar cell panel 121a has a maximum output of 7 kWh as being determined by the intensity of sunlight, and the output ratio R21 is 50%, the photovoltaic device 121 delivers an output electric energy P2 (P21) of 3.5 kWh at the output of the photovoltaic cell-use inverter 121b in response to an input from the control device 300 of an operational instruction C21 dictating that the output ratio R21 with respect to the 7-kWh maximum output be 50%.

The wind-powered electric generator 122 includes a wind turbine 122a, a wind-generated electric power converter 122b, and an AC circuit breaker 122c. In the wind-powered electric generator 122, the wind turbine 122a rotates with wind for power generation. The generated electric power is converted to AC electric energy P2 (P22) by the wind-generated electric power converter 122b. The converted electric energy P2 (P22) is fed to the electric power supply line PL via the AC circuit breaker 122c. The wind-powered electric generator 122 is connected to the output system of the control device 300 so that it can change its output (electric energy P22) in response to an operational instruction C2 (C22) from the control device 300 (i.e., an operational instruction on the output ratio R2 (R22) with respect to the maximum output of the wind turbine 122a that depends on the wind air flow, specifically an operational instruction on the duty ratio of a switching element in the wind-generated electric power converter 122b). As an example, where the wind turbine 122a has a rated output of 5 kWh, but the wind turbine 122a has a maximum output of 3 kWh as being determined by the wind air flow, and the output ratio R22 is 50%, the wind-powered electric generator 122 delivers an output electric energy P2 (P22) of 1.5 kWh at the output of the wind-generated electric power converter 122b in response to an input from the control device 300 of an operational instruction C22 dictating that the output ratio 122 with respect to the 3-kWh maximum output be 50%.

In the present embodiment, the RES 120 exploits natural energy for electric energy output. This is however for illustrative purposes only. Examples of the RES 120 include those that exploit solar heat, geothermal heat, or another form of natural energy for thermal energy output.

The electric storage unit 130 in the present embodiment includes a rechargeable battery 131, an electric storage-use inverter 132, and an AC circuit breaker 133. The electric storage unit 130 is connected to the output system of the control device 300. In the electric storage unit 130, the rechargeable battery 131 is charged by the electric energy supply from the electric power supply line PL via a rectifier circuit (not shown) in response to an operational instruction C3 from the control device 300. The rechargeable battery 131 also discharges DC electric energy, which is converted to AC electric energy P3 by the electric storage-use inverter 132 and fed to the electric power supply line PL via the AC circuit breaker 133 in response to an operational instruction C3 from the control device 300.

The thermal accumulation unit 140, in the present embodiment, includes a thermal accumulator 141 (e.g., a thermal storage tank) and a thermal energy regulation section 142 (specifically, a thermal energy regulation valve). In the thermal accumulation unit 140, the thermal accumulator 141 stores thermal energy (e.g., in the form of water vapor or hot water) supplied from the heat supply line TL. The thermal accumulator 141 also delivers thermal energy Q4 (e.g., in the form of water vapor or hot water) to the heat supply line TL via the thermal energy regulation section 142.

The thermal accumulator 141 may include a cooling storage device (e.g., ice-making tank) capable of storing thermal energy at lower-than-normal temperature in place of or in addition to a heating storage device (e.g., thermal storage tank) capable of storing thermal energy at higher-than-normal temperature.

The thermal energy supply system 150 is a gas boiler in the present embodiment. The thermal energy supply system 150 includes a fuel flow rate regulation valve 151 and a boiler 152. The thermal energy supply system 150 heats the boiler 152 using the fuel supplied from the fuel supply source F via the fuel flow rate regulation valve 151. The thermal energy Q5 of the obtained water vapor or hot water is fed to the heat supply line TL in response to an operational instruction C5 from the control device 300 (i.e., an operational instruction on the output ratio R5 with respect to the rated thermal energy output, specifically an operational instruction C5 on the opening of the adjusting valve 153 disposed on the heat supply line TL of the boiler 152). As an example, for a rated thermal energy output of 36,000 kJ and an output ratio R5 of 50%, the thermal energy supply system 150 operates generating a thermal energy Q5 of 18,000 kJ in response to an input from the control device 300 of an operational instruction C5 dictating that the output ratio R5 with respect to the 36,000-kJ rated thermal energy output be 50%.

Examples of the electric load 160 include an electric lamp and an electric appliance (e.g., electric cooling device). Examples of the thermal load 170 include an absorption cooling device, an air cooling device, and an air heating device. Conceptually, the thermal load 170 encompasses cold thermal loads at lower-than-normal temperature as well as hot thermal loads at higher-than-normal temperature. In other words, thermal energy in the current context refers to both hot thermal energy and cold thermal energy.

The electric load 160 and the thermal load 170 may be classified into categories (a) to (d) below.

(a) Non-Adjustable Loads (First Loads L1) that Consume Uninterruptible Energy Consumption for Energy Demand First loads L1 are, for example, electric and air-conditioning appliances installed in a test laboratory where endurance tests are conducted, medical and air-conditioning appliances installed in a medical room (operating room, intensive care unit, etc.), and power supply and air-conditioning appliances installed in a computer room. The first load L1 is given highest priority because it needs to continuously consume electric and thermal energy. The first load L1 is therefore not controllable by the control device 300.

(b) Interruptible and Adjustable Loads (Second Loads L2)

Second loads L2 are, for example, electric and air-conditioning appliances installed in a general residential facility or for industrial utilities. The second load L2 is a common load capable of alternating between consumption of electric and thermal energy and discontinuation of the consumption at any given time. The second load L2 is therefore controllable by the control device 300. The second load L2 is connected to the output system of the control device 300 so that it can change its electric and thermal energy consumption in response to operational instructions C6 (C62) and C7 (C72) from the control device 300 (i.e., operational instructions on the consumption ratio of the second load L2 with respect to its rated energy consumption).

(c) Manageable Loads (Third Loads L3) that are not Allowed to Discontinue their Operation Until a Total Operation Time is Reached Once they Start to Operate Third loads L3 are, for example, electricity ovens, electric melting furnaces in foundries, and experimental equipment. The third load L3 is capable of alternating between consumption of electric and thermal energy and discontinuation of the consumption, but not allowed to discontinue its energy consumption for a certain continuous period of time once it starts to operate. The third load L3 is therefore controllable by the control device 300. The third load L3 is connected to the output system of the control device 300 so that it can change its electric and thermal energy consumption in response to operational instructions C6 (C63) and C7 (C73) from the control device 300 (operational instructions on the consumption ratio of the third load L3 with respect to its rated energy consumption).

(d) Manageable Loads (Fourth Loads L4) that are, after Starting to Operate, Allowed to Discontinue their Operation if a Total Operation Time is Reached within a Predetermined Period of Time (e.g., on the Same Day)

Fourth loads L4 are, for example, washing machines in an industrial laundry facility, batch process machines, and battery chargers for electric appliances. The fourth load L4 is capable of alternating between consumption of electric and thermal energy and discontinuation of the consumption at any given time if a predetermined total operation time is reached before or at the end of a predetermined period (e.g., at the end of the day). The fourth load L4 is therefore controllable by the control device 300. The fourth load L4 is connected to the output system of the control device 300 so that it can change its electric and thermal energy consumption in response to operational instructions C6 (C64) and C7 (C74) from the control device 300 (operational instructions on the consumption ratio of the fourth load L4 with respect to its rated energy consumption).

The electric power supply line PL is connected electrically to the CHP 110, the RES 120, the electric storage unit 130, the electric load 160, and the electric power grid 200. The heat supply line TL is connected thermally to the CHP 110, the thermal accumulation unit 140, the thermal energy supply system 150, and the thermal load 170. If the RES 120 exploits natural energy for thermal energy output, the heat supply line TL is also connected thermally to the RES 120.

Control Device

The control device 300 controls the whole electric and thermal energy network 100.

Figure 4:
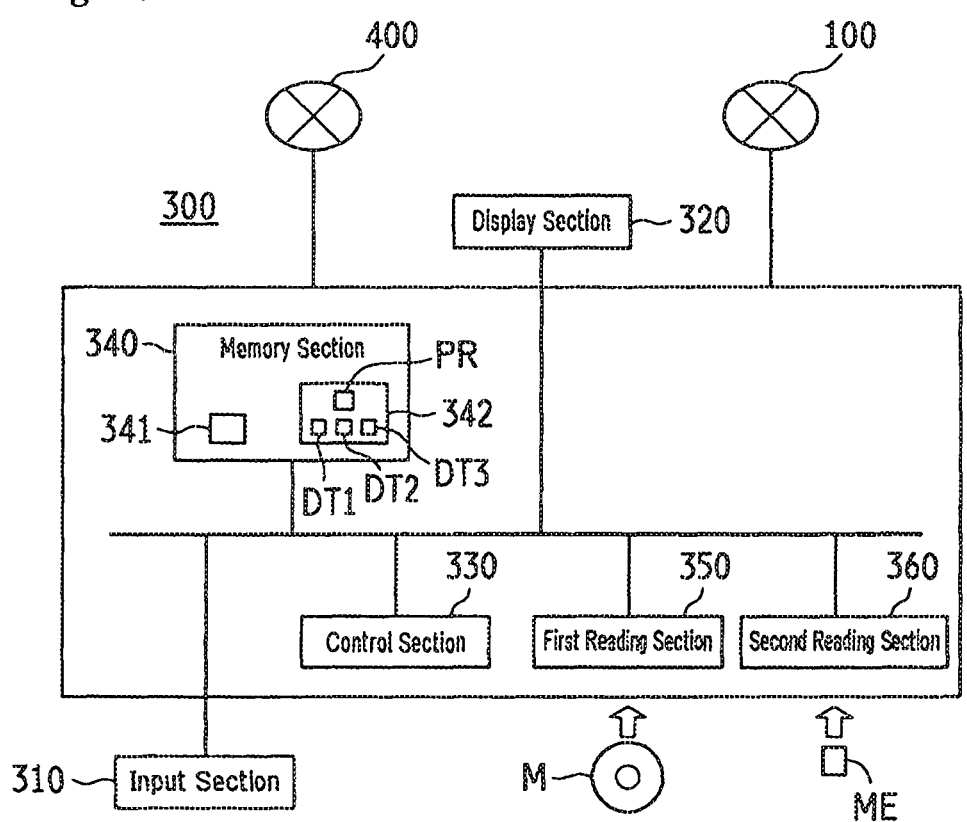
FIG. 4 is a schematic block diagram illustrating a control device and its related apparatus for the electric and thermal energy network shown in FIGS. 2 and 3.

FIG. 4 is a schematic block diagram illustrating a control device 300 and its related apparatus for the electric and thermal energy network 100 shown in FIGS. 2 and 3.

As illustrated in FIG. 4, the control device (computer) 300 is provided with external devices (man/machine interfaces) including an input section 310, such as a keyboard and a pointing device, and a display section 320, such as a display device.

The control device 300 in this embodiment of the present invention may be connected to the Internet 400, as well as to the electric and thermal energy network 100.

The control device 300 is provided with internal devices including a control section 330, a memory section 340, a first reading section 350, and a second reading section 360. The control section 330 is, for example, a CPU (central processing unit) and executes a computer program PR, computations, and other various processes. The memory section 340 contains a volatile memory 341, such as a RAM (random access memory), and a non-volatile memory 342, such as a ROM (read-only memory) and/or an electrically rewritable non-volatile ROM.

The control section 330 controls the display section 320 to display various input screens so that it can receive input of necessary information from the user operating the input section 310.

The volatile memory 341 is used, for example, as working memory when needed in the computations and other various processes executed by the control section 330. The non-volatile memory 342 includes, for example, a hard disk device and a flash memory.

The first reading section 350 is capable of reading a computer-readable storage medium M, such as a CD (compact disc)-ROM, containing the computer program PR. The non-volatile memory 342 pre-records software including the computer program PR, which has been read by the first reading section 350. The storage medium M may be a USB (universal serial bus) memory or a SD (secure digital) memory. The computer program PR may be downloaded over the Internet 400. The second reading section 360, in the present embodiment, reads an external storage medium ME. The external storage medium ME is typically a USB memory, but by no means limited to this example.

Energy demand data DT1, unit energy price data DT2, and weather condition data DT3 shown in FIG. 4 will be described later in detail.

The optimization of the energy management for the electric and thermal energy network 100 is performed by the control device 300 running the computer program PR.

Software Configuration for Computer Program

Figure 5:
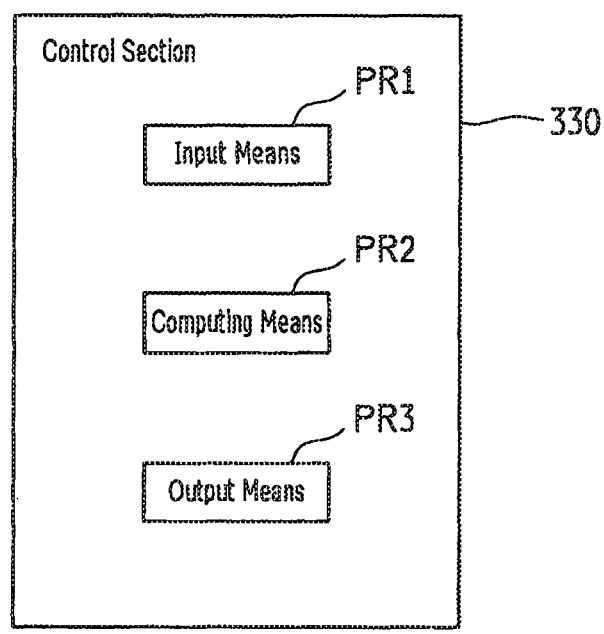
FIG. 5 is a schematic illustration of the structure of a control section in the control device shown in FIG. 4.

FIG. 5 is a schematic illustration of the structure of the control section 330 in the control device 300 shown in FIG. 4.

The computer program PR enables the control section 330 in the control device 300 to function as various means including input means PR1, computing means PR2, and output means PR3. In other words, the computer program PR enables the control device 300 (specifically, control section 330) to perform steps including an input step corresponding to the input means PR1, a computing step corresponding to the computing means PR2, and an output step corresponding to the output means PR3. To put it differently, the control device 300 (specifically, control section 330) functions as various means including the input means PR1, the computing means PR2, and the output means PR3.

Input Step

In the input step, the control device 300 receives energy demand data DT1 on forecast energy demand (see FIG. 4), unit energy price data DT2 on unit energy price (see FIG. 4), and weather condition data DT3 on forecast weather conditions of the geographical region covered by the electric and thermal energy network 100 (see FIG. 4).

In the present embodiment, the energy demand data DT1 is directly input through the input section 310 by the user and obtained by the control device 300. The unit energy price data DT2 and the weather condition data DT3 are automatically obtained from a Web site on the Internet 400 by the control device 300.

The memory section 340 (e.g., the non-volatile memory 342) pre-records the energy demand data DT1 obtained by the input section 310. The memory section 340 (e.g., the non-volatile memory 342) also pre-records the unit energy price data DT2 and the weather condition data DT3 both obtained from a Web site on the Internet 400.

Each of the energy demand data DT1, the unit energy price data DT2, and the weather condition data DT3 is sets of time-sequential data on the processing target to be processed, covering a predetermined period of time T (e.g., 24 hours) with each set being separated by the preceding and succeeding ones by a predetermined unit time UT (e.g., 15 minutes, or 0.25 hours). The energy demand data DT1, the unit energy price data DT2, and the weather condition data DT3 therefore each consist of N sets ("processing units") of time-sequential data, where N=T/UT, or the predetermined period of time T divided by the unit time UT. For example, the energy demand data DT1, the unit energy price data DT2, and the weather condition data DT3 may cover the whole next single day (e.g., for a unit time UT of 15 minutes, there are 24 hours/0.25 hours=96 processing units), half of the next day (either from midnight to noon or from noon to midnight) (e.g., for a unit time UT of 15 minutes, there are 12 hours/0.25 hours=48 processing units), a shorter time period, or a time period longer than a single day.

The control device 300 optimizes energy management in advance (e.g., either collectively some time on the preceding day, or December 24, so that the optimization is completed by 00:00:00 of December 25 or immediately before every unit time UT on the day of interest, or December 25, as necessary) before a forecast period for the energy demand data DT1 and the weather condition data DT3 (e.g., from 00:00:00 to 23:59:59 of the next day, or December 25). The control device 300 also performs energy management for the electric and thermal energy network 100 according to processing units (e.g., 96 processing units when the unit time UT is 15 minutes) for a corresponding unit time UT in the forecast period for the energy demand data DT1 and the weather condition data DT3 00:00:00 to 23:59:59 of the day of interest, or December 25).

The energy demand data DT1 indicates energy consumption every unit time UT in the forecast period including uninterruptible energy consumption for energy demand (the energy consumption by the first load L1).

The energy demand data DT1 indicates forecast electric power demand (forecast electric energy demand at equal time intervals) and forecast thermal energy demand (forecast thermal energy demand at equal time intervals). The energy demand data DT1 may indicate an electric power exchange profile for the electric power grid 200. An electric power exchange profile in this context is information representing forecast electric power demand (forecast electric energy demand at equal time intervals) as agreed upon with a utility company (electric power company). If a consumer fails to follow the profile, he/she could be given a penalty.

In the present embodiment, the energy demand data DT1 is directly input to the control device 300 by the user. Alternatively, the energy demand data DT1 may be input to the control device 300 from a Web site on the Internet 400 or using the external storage medium ME (see FIG. 4). If the energy demand data DT1 is input from a Web site on the Internet 400, the memory section 340 (e.g., the non-volatile memory 342) pre-records the energy demand data DT1 input from the Web site. If the energy demand data DT1 is input using the external storage medium ME, the second reading section 360 reads the external storage medium ME containing the energy demand data DT1, and the memory section 340 (e.g., the non-volatile memory 342) pre-records the energy demand data DT1 which has been read by the second reading section 360.

The unit energy price data DT2 and the weather condition data DT3 are obtained from a Web site on the Internet 400. Alternatively, the unit energy price data DT2 and the weather condition data DT3 may be directly input to the control device 300 by the user or/and also using the external storage medium ME. If the unit energy price data DT2 and/or the weather condition data DT3 are/is directly input by the user, the memory section 340 (e.g., the non-volatile memory 342) pre-records the unit energy price data DT2 and/or the weather condition data DT3 which have/has been directly input by the user. If the unit energy price data DT2 and/or the weather condition data DT3 are/is input using the external storage medium ME, the second reading section 360 reads an external storage medium ME containing the unit energy price data DT2 and/or the weather condition data DT3, and the memory section 340 (e.g., the non-volatile memory 342) pre-records the unit energy price data DT2 and/or the weather condition data DT3 which have/has been read by the second reading section 360.

In this context, typical examples of the unit energy price data DT2 include a unit electric energy price per kilowatt-hour as an electric utility fee for the electric power grid 200 and a unit thermal energy price per cubic meter of gas as a gas fee for the CHP 110 and the thermal energy supply system 150. In the present embodiment, the CHP 110 and the thermal energy supply system 150 use a gas as their fuel and may use solid fuel. When this is the case, the unit energy price data DT2 may be, for example, a unit thermal energy price per unit weight of the solid fuel.

The weather condition data DT3 may be, as in the present embodiment, the angle of the sun and cloudiness when the RES 120 is the photovoltaic device 121 and the wind direction and speed when the RES 120 is the wind-powered electric generator 122. The weather condition data DT3 is weather condition data for the geographical region covered by the electric and thermal energy network 100, specifically weather condition data for the geographical region where the RES 120 (in this example, the photovoltaic device 121 and the wind-powered electric generator 122) is installed.

Computing Step

The computing step repeatedly generates two or more energy balance candidates for each unit time UT (e.g., every 15 minutes) for the output of the electric power grid 200 (electric energy Pp) and the output of the thermal accumulation unit 140 by combining varied values of the output ratio R1 of the CHP 110, the output ratio R2 of the RES 120, the output ratio R5 of the thermal energy supply system, the consumption ratio R6 of the electric load 160, the output ratio R3 of the electric storage unit 130, and the consumption ratio R7 of the thermal load 170 until the convergence of the evaluation values of the two or more candidates reaches predetermined convergence criteria.

To describe it in more detail, the entire range of the output ratio R1 (from zero output (0%) to rated output (100%)) of the CHP 110 is evenly divided so that the range can be represented by a number of values that is equal to a predetermined division count DI (e.g., $2^8$=256). Specifically, the output ratio R1 is 0% for "00000000" (=0 in decimal form), 1×100%/255=0.39% for "00000001" (=1 in decimal form), 2×100%/255=0.78% for "00000010" (=2 in decimal form), . . . , 254×100%/255=99.6% for "11111110" (=254 in decimal form), and 255×100%/255=100% for "11111111" (=255 in decimal form). Then, in the computing step, the output ratio R1 of the CHP 110 is converted to one of values selected from the values obtained by the foregoing division of the range (specifically, those values that divide the range, 0% (00000000) to 100% (11111111), into 1/255=0.39% intervals).

The same procedures may be applied to the entire range of the output ratio R2 of the RES 120, the output ratio R5 of the thermal energy supply system 150, and the output ratio R3 of the electric storage unit 130 so that the range can be evenly divided and represented by a number of values that is equal to a predetermined division count DI (e.g., $2^8$=256).

Due to the performance of the CHP 110, the output ratio R2 of the CHP 110 may be set to 0%, or "00000000," if it is less than or equal to a predetermined ratio (e.g., 10%).

The entire range of the consumption ratio R6 (from zero consume (0%) to rated energy consumption (100%)) of the electric load 160 is evenly divided so that the range can be represented by a number of values that is equal to a predetermined division count DI (e.g., $2^8$=256). Specifically, the consumption ratio R6 is 0% for "00000000" (=0 in decimal form), 1×100%/255=0.39% for "00000001" (=1 in decimal form), 2×100° 4/255=0.78% for "00000010" (=2 in decimal form), . . . , 254×100%/255=99.6% for "11111110" (=254 in decimal form), and 255×100%/255=100% for "11111111" (=255 in decimal form). Then, in the computing step, the consumption ratio R6 of the electric load 160 is converted to one of values selected from the values obtained by the foregoing division of the range (specifically, those values that divide the range, 0% (00000000) to 100% (11111111), into 1/255=0.39% intervals).

The same procedures may be applied to the entire range of the consumption ratio R7 of the thermal load 170 so that the range can be evenly divided and represented by a number of values that is equal to a predetermined division count DI (e.g., $2^8$=256).

The division count DI may assume different values for the output ratio R1 of the CHP 110, the output ratio R2 of the RES 120, the output ratio R5 of the thermal energy supply system 150, and the output ratio R3 of the electric storage unit 130, the consumption ratio R6 of the electric load 160, and the consumption ratio R7 of the thermal load 170.

The computing step includes a first calculation process, a second calculation process, an evaluation process, and a selection process.

First Calculation Process

In the first calculation process, the output of the CHP 110 (electric energy P1 and thermal energy Q1) is calculated by multiplying the rated output of the CHP HO and the output ratio R1 of the CHP 110 together.

Specifically, in the first calculation process, the entire range of the electric energy output ratio R11 of the CHP 110 is evenly divided so that the range can be represented by 256 values. For example, when the rated electric energy output of the CHP 110 is 25.1 kWh, and the output ratio R11 of the CHP 110 is represented by "00111101" (=61 in decimal form), the output ratio R11 is 23.9%, and the electric energy output P1 of the CUP 110 is 25.1 kWh×23.9%=6 kWh. The thermal energy output Q1 of the CHP 110 is similarly determined by evenly dividing the entire range of the thermal energy output ratio R12 of the CHP 110 so that the range can be represented by 256 values.

Also in the first calculation process, the output of the RES 120 (in this example, the electric energy P2) is calculated by multiplying the maximum output of the RES 120 and the output ratio R2 of the RES 120, both based on weather conditions, together.

Specifically, in the first calculation process, if the RES 120 is the photovoltaic device 121, the entire range of the output ratio R21 of the photovoltaic device 121 is evenly divided so that the range can be represented by 256 values. The maximum output of the photovoltaic device 121 is then calculated using a photovoltaic cell conversion formula or table. The conversion formula and table are designed so that by using either of them, one can determine the maximum output of the photovoltaic device 121 from the intensity of sunlight given in the weather condition data DT3 in the form of the angle of the sun and cloudiness. For example, when the maximum output of the photovoltaic device 121 is determined to be 2.51 kWh, and the output ratio R21 of the photovoltaic device 121 is represented by "00111101" (=61 in decimal form), the output ratio R21 is 23.9%, and the output (electric energy P21) of the photovoltaic device 121 is 2.51 kWh×23.9%=0.6 kWh. Likewise, if the RES 120 is the wind-powered electric generator 122, the output of the RES 120 is similarly determined using a wind-powered generator conversion formula or table that are designed so that by using either of them, one can determine the maximum output of the wind-powered electric generator 122 from the wind air flow given in the weather condition data DT3 in the form of wind direction and speed. If the RES 120 exploits natural energy for thermal energy output, its output (thermal energy) is similarly determined. The conversion formulae and tables may be predetermined (and stored in the memory section 340) based on, for example, the specifications of the RES 120.

Also in the first calculation process, the output of the thermal energy supply system 150 (thermal energy Q5) is calculated by multiplying the rated output of the thermal energy supply system 150 and the output ratio R5 of the thermal energy supply system 150 together.

Specifically, in the first calculation process, the entire range of the output ratio R5 of the thermal energy supply system 150 is evenly divided so that the range can be represented by 256 values. For example, when the rated thermal energy output of the thermal energy supply system 150 is 86,000 kJ, and the output ratio R5 of the thermal energy supply system 150 is represented by "00111101" (=61 in decimal form), the output ratio R5 is 23.9%, and the thermal energy output Q5 of the thermal energy supply system 150 is 86,000 kJ×23.9%=20,554 kJ.

Also in the first calculation process, the output of the electric storage unit 130 (in this example, the electric energy P3) is calculated by multiplying the maximum output of the electric storage unit 130 and the output ratio R3 of the electric storage unit 130, based on the charge conditions, together.

Specifically, in the first calculation process, the entire range of the output ratio R3 of the electric storage unit 130 is evenly divided so that the range can be represented by 256 values. The maximum output of the electric storage unit 130 is then calculated based on the state of charge of the electric storage unit 130 and on the maximum energy content of the electric storage unit 130 so that by using either of them, one can determine the maximum output of the electric storage unit 130. For example, when the state of charge of the electric storage unit 130 is determined to be 50% and the maximum energy content of the electric storage unit 130 is 5 kWh, and the output ratio R3 of the electric storage unit 130 is represented by "00111101" (=61 in decimal form), the output ratio R3 is 23.9%, and the output (electric energy P3) of the electric storage unit 130 is 5 kWh×50%×23.9%=0.6 kWh.

Further in the first calculation process, the energy consumption (electric energy consumption) of the electric load 160 is calculated by multiplying the rated power consumption of the electric load 160 and the consumption ratio R6 of the electric load 160 together, and the energy consumption (thermal energy consumption) of the thermal load 170 is calculated by multiplying the rated power consumption of the thermal load 170 and the consumption ratio R7 of the thermal load 170 together. Here, the energy consumption of the electric load 160 and that of the thermal load 170 are respectively parts other than the energy consumption of the first load L1.

Specifically, in the first calculation process, the entire range of the consumption ratio R6 of the electric load 160 is evenly divided so that the range can be represented by 256 values. For example, when the rated power consumption of the electric load 160 is 25.1 kWh, and the consumption ratio R6 of the electric load 160 is represented by "00111101" (=61 in decimal form), the consumption ratio R6 is 23.9%, and the energy consumption of the electric load 160 is 25.1 kWh×23.9%=6 kWh. The energy consumption of the thermal load 170 is similarly determined by evenly dividing the entire range of the thermal energy consumption ratio R7 of the thermal load 170 so that the range can be represented by 256 values.

Second Calculation Process

In the second calculation process, a difference between a total electric energy (total electric energy consumption) and another total electric energy (total electric energy supply) is calculated as an output (electric energy Pp) of the electric power grid 200. The total electric energy consumption is a sum of the uninterruptible electric energy consumption manually fed in the input step and given in the energy demand data DT1 and the electric energy consumption of the electric load 160 obtained in the first calculation process. The total electric energy supply is a sum of the output (electric energy P1) of the CHP 110 obtained in the first calculation process, the output (electric energy P2) of the RES 120 obtained in the first calculation process, and the electric energy P3 of the electric storage unit 130 obtained in the first calculation process. Also in the second calculation process, a difference between a total thermal energy (total thermal energy consumption) and another total thermal energy (total thermal energy supply) is calculated as an output (thermal energy Q4) of the thermal accumulation unit 140. The total thermal energy consumption is a sum of the uninterruptible thermal energy consumption manually fed in the input step and given in the energy demand data DT1 and the thermal energy consumption of the thermal load 170 obtained in the first calculation process. The total thermal energy supply is a sum of the output (thermal energy Q1) of the CHP 110 and the thermal energy Q5 of the thermal energy supply system 150 obtained in the first calculation process.

The uninterruptible electric energy consumption given in the energy demand data DT1 is the energy consumed by the first load L1 which is part of the electric load 160. The uninterruptible thermal energy consumption given in the energy demand data DT1 is energy consumed by the first load L1 which is part of the thermal load 170.

The electric power grid 200 covers an electric energy shortage in view of a total electric energy (total electric energy consumption; the sum of the uninterruptible electric energy consumption of the first load L1 given in the energy demand data DT1 and the electric energy consumption of the second load L2, the third load L3, and the fourth load L4 each of which is part of the electric load 160) and another total electric energy (total electric energy supply; the sum of the electric energy supply P1 from the CHP 110, the electric energy supply P2 from the RES 120, and the electric energy supply P3 from the electric storage unit 130). The thermal accumulation unit 140 covers a thermal energy shortage in view of a total thermal energy (total thermal energy consumption; the sum of the uninterruptible thermal energy consumption of the first load L1 given in the energy demand data DT1 and the thermal energy consumption of the second load L2, the third load L3, and the fourth load L4 each of which is part of the thermal load 170) and another total thermal energy (total thermal energy supply; the sum of the thermal energy supply Q1 from the CHP 110 and the thermal energy supply Q5 from the thermal energy supply system 150).

If the RES 120 exploits natural energy for thermal energy output, the total thermal energy (total thermal energy supply) is inclusive of the thermal energy supply from the RES 120.

Evaluation Process

In the evaluation process, two or more energy balance candidates for each unit time UT are evaluated in accordance with evaluation criteria that include an electric energy supply cost based on a unit electric energy price; a thermal energy supply cost based on a unit thermal energy price; a $CO_2$ emission based on the electric energy output P1 of the CHP 110 and the electric energy output Pp of the electric power grid 200; a $CO_2$ emission based on the thermal energy output Q1 of the CHP 110 and the thermal energy output Q5 of the thermal energy supply system 150; a primary energy consumption based on the electric energy output P1 of the CHP 110 and the electric energy output Pp of the electric power grid 200; and a primary energy consumption based on the thermal energy output Q1 of the CHP 110 and the thermal energy output Q5 of the thermal energy supply system 150.

To describe it in more detail, the energy supply cost is obtained by adding a first electric energy supply cost, a second electric energy supply cost, a first thermal energy supply cost, and a second thermal energy supply cost together. The first electric energy supply cost is calculated by multiplying the electric energy output P1 of the CHP 110 obtained in the first calculation process and the unit electric energy price obtained in the input step together. The first thermal energy supply cost is calculated by multiplying the thermal energy output Q1 of the CHP 110 obtained in the first calculation process and the unit thermal energy price obtained in the input step together. The second electric energy supply cost is calculated by multiplying the electric energy output Pp of the electric power grid 200 obtained in the second calculation process and the unit electric energy price obtained in the input step together. The second thermal energy supply cost is calculated by multiplying the thermal energy output Q5 of the thermal energy supply system 150 obtained in the second calculation process and the unit thermal energy price obtained in the input step together.

The $CO_2$ emission is obtained by adding first, second and third $CO_2$ emissions together. The first $CO_2$ emission is obtained by converting the electric energy output P1 of the CHP 110 obtained in the first calculation process using a $CO_2$ emission conversion formula or table. The second $CO_2$ emission is obtained by converting the electric energy output Pp of the electric power grid 200 obtained in the second calculation process using a $CO_2$ emission conversion formula or table. The third $CO_2$ emission is obtained by converting the thermal energy output Q5 of the thermal energy supply system 150 obtained in the second calculation process using a $CO_2$ emission conversion formula or table. The $CO_2$ emission conversion formulae or tables are pre-recorded in the memory section 340. The conversion of the electric energy output P1 of the CHP 110 to a $CO_2$ emission, the conversion of the electric energy output Pp of the electric power grid 200 to a $CO_2$ emission, the conversion of the thermal energy output Q1 of the CHP 110 to a $CO_2$ emission, and the conversion of the thermal energy output Q5 of the thermal energy supply system 150 to a $CO_2$ emission are carried out by publicly known, conventional technique; no detailed description is given here.

The primary energy consumption is obtained by adding first, second and third primary energy consumptions together. The first primary energy consumption is obtained by converting the electric energy output P1 of the CHP 110 obtained in the first calculation process using a primary energy consumption conversion formula or table. The second primary energy consumption is obtained by converting the electric energy output Pp of the electric power grid 200 obtained in the second calculation process using a primary energy consumption conversion formula or table. The third primary energy consumption is obtained by converting the thermal energy output Q5 of the thermal energy supply system 150 obtained in the second calculation process using a primary energy consumption conversion formula or table. The primary energy consumption conversion formulae or tables are pre-recorded in the memory section 340. The conversion of the electric energy output P1 of the CHP 110 to a primary energy consumption, the conversion of the electric energy output Pp of the electric power grid 200 to a primary energy consumption, the conversion of the thermal energy output Q1 of the CHP 110 to a primary energy consumption, and the conversion of the thermal energy output Q5 of the thermal energy supply system 150 to a primary energy consumption are carried out by publicly known, conventional technique; no detailed description is given here.

In the evaluation process, two or more energy balance candidates for each unit time UT are evaluated based on the energy supply costs, $CO_2$ emissions, and primary energy consumptions obtained in the above manner.

To describe it in more detail, in the evaluation process, an evaluation value is determined from an energy supply cost, a $CO_2$ emission, and a primary energy consumption by means of an objective function. A candidate will be evaluated progressively positively with a larger or smaller evaluation value. In the present embodiment, a smaller evaluation value represents a more positive evaluation of the candidate. The objective function is pre-recorded in the memory section 340. The objective function includes as its variables an energy supply cost, a $CO_2$ emission, and a primary energy consumption. For example, in the evaluation process, the evaluation values of two or more energy balance candidates for each unit time UT may be determined by plugging in their energy supply costs, $CO_2$ emissions, and primary energy consumptions into a predetermined evaluation formula. Alternatively, the evaluation values may be determined by ranking the energy supply costs, $CO_2$ emissions, and primary energy consumptions and summing up the ranks of the energy supply costs, the ranks of the $CO_2$ emissions, and the ranks of the primary energy consumptions. The evaluation process is however by no means limited to these examples.

When the evaluation process uses an electric power exchange profile as another evaluation criterion, progressively positive evaluation is given to a better matching between the total electric energy output of the electric power grid 200 and the electric power demand in the electric power exchange profile. The power exchange profile requested from the grid can be satisfied by adding it to the evaluation process.

Selection Process

In the selection process, a most positive evaluation candidate is selected from the two or more energy balance candidates for each unit time UT. The most positive evaluation candidate is one of these candidates that yields the most positive evaluation when the convergence of the evaluation values of the candidates has reached predetermined convergence criteria. In the selection process, the convergence of the evaluation values of the two or more candidates may be taken as having reached convergence criteria when the variance statistically calculated from the evaluation values of the two or more candidates comes to converge within convergence criteria. In the selection process, a most positive evaluation candidate may be selected that yields the most positive evaluation when the evaluation is repeated a predetermined number of times (repetition count) even if the convergence of the evaluation values of the two or more candidates has not reached the convergence criteria. When this is the case, the most positive evaluation candidate that yields the most positive evaluation as a result of the combination of the energy supply cost, $CO_2$ emission, and primary energy consumption yielding the smallest or largest (in this example, the smallest) evaluation value (e.g., the evaluation value obtained from an evaluation formula or the evaluation value obtained from ranking) is selected from the two or more candidates in the selection process.

Output Step

In the output step, the operational instructions C1 (C11 and C12), C2 (C21 and C22), C5, C3, C6 (C62 to C64), and C7 (C72 to C74) for each unit time UT are transmitted (output) respectively to the CHP 110, the RES 120, the thermal energy supply system 150, the electric storage unit 130, the electric load 160, and the thermal load 170. The operational instructions C1, C2, C5, C3, C6, and C7 are obtained based on the most positive evaluation candidate obtained in the selection process and given respectively to the CHP 110, the RES 120, the thermal energy supply system 150, the electric storage unit 130, the electric load 160, and the thermal load 170.

To describe it in more detail, in the output step, the operational instructions C1 (C11 and C12), C2 (C21 and C22), C5, C3, C6 (C62 to C64), and C7 (C72 to C74) corresponding to a combination (for each unit time UT) of the output ratios R1 (R11 and R12) of the CHP 110, the output ratios R2 (R21 and R22) of the RES 120, the output ratio R5 of the thermal energy supply system 150, the output ratio R3 of the electric storage unit 130, the consumption ratios R6 (R62 to R64) of the electric load 160, and the consumption ratios R7 (R72 to R74) of the thermal load 170 are transmitted respectively to the CHP 110, the RES 120, the thermal energy supply system 150, the electric storage unit 130, the electric load 160, and the thermal load 170, the combination yielding the most positive evaluation candidate obtained in the selection process.

Specifically, in the output step, as the most positive evaluation candidate for each unit time UT obtained in the selection process, the operational instructions C11(1) to C11(N) corresponding respectively to the electric energy output ratios R11(1) to R11(N) of the CHP 110 are transmitted to the CHP 110, the operational instructions C12(1) to C12(N) corresponding respectively to the thermal energy output ratios R12(1) to R12(N) of the CHP 110 are transmitted to the CHP 110, the operational instructions C21(1) to C21(N) corresponding respectively to the output ratios R21(1) to R21(N) of the photovoltaic device 121 (RES 120) are transmitted to the photovoltaic device 121, the operational instructions C22(1) to C22(N) corresponding respectively to the output ratios R22(1) to R22(N) of the wind-powered electric generator 122 (RES 120) are transmitted to the wind-powered electric generator 122, the operational instructions C5(1) to C5(N) corresponding respectively to the output ratios R5(1) to R5(N) of the thermal energy supply system 150 are transmitted to the thermal energy supply system 150 and the operational instructions C3(1) to C3(N) corresponding respectively to output ratios R3(1) to R3(N) of the electric storage unit 130 are transmitted to the electric storage unit 130.

N is an integer greater than or equal to 2 and, as mentioned earlier, indicates the number of processing units (e.g., 96 processing units) that is obtained by dividing the predetermined period of time to be processed (e.g., 1 day=24 hours) by the unit time UT (e.g., 15 minutes=0.25 hours).

In the output step, as the most positive evaluation candidate for each unit time UT obtained in the selection process, the operational instructions C62(1) to C62(N) corresponding respectively to the consumption ratios R62(1) to R62(N) of the second load L2, a part of the electric load 160, are transmitted to the second load L2 when the second load L2 is to consume the electric energy, the operational instructions C63(1) to C63(N) corresponding respectively to the consumption ratios R63(1) to R63(N) of the third load L3, a part of the electric load 160, are transmitted to the third load L3 when the third load L3 is to consume electric energy, and the operational instructions C64(1) to C64(N) corresponding respectively to the consumption ratios R64(1) to R64(N) of the fourth load L4, a part of the electric load 160, are transmitted to the fourth load L4 when the fourth load L4 is to consume electric energy.

Also in the output step, as the most positive evaluation candidate for each unit time UT obtained in the selection process, the operational instructions C72(1) to C72(N) corresponding respectively to the consumption ratios R72(1) to R72(N) of the second load L2, a part of the thermal load 170, are transmitted to the second load L2 when the second load L2 is to consume thermal energy, the operational instructions C73(1) to C73(N) corresponding respectively to the consumption ratios R73(1) to R73(N) of the third load L3, a part of the thermal load 170, are transmitted to the third load L3 when the third load L3 is to consume thermal energy, and the operational instructions C74(1) to C74(N) corresponding respectively to the consumption ratios R74(1) to R74(N) of the fourth load L4, a part of the thermal load 170, are transmitted to the fourth load L4 when the fourth load L4 is to consume thermal energy.

In the present embodiment, there is provided a single CHP 110. Alternatively, there may be provided a plurality of CHPs 110. In addition, although there are provided two RES's 120, there may be provided a single RES 120 or three or more RES's 120.

As described above, according to the present embodiment, in the input step (according to the input means PR1), a forecast energy demand, a unit energy price, and forecast weather conditions are received. Then, in the first calculation process of the computing step (carried out by the computing means PR2), the outputs (electric energy P1 and thermal energy Q1) of the CHP 110 are calculated from the rated output of the CHP 110 and the output ratios R1 (R11 and R12) of the CHP no; the output (in this example, electric energy P21 and P22) of the RES 120 is calculated from the maximum output of the RES 120 and the output ratios R2 (R21 and R22) of the RES 120 based on the weather conditions; the output (thermal energy Q5) of the thermal energy supply system 150 is calculated from the rated output of the thermal energy supply system 150 and the output ratio R5 of the thermal energy supply system 150; the output (electric energy P3) of the electric storage unit 130 is calculated from the maximum output of the electric storage unit 130 and the output ratio R3 of the electric storage unit 130, based on the charge conditions; the electric energy consumption of the electric load 160 is calculated from the rated power consumption of the electric load 160 and the consumption ratio R6 of the electric load 160; and the thermal energy consumption of the thermal load 170 is calculated from the rated power consumption of the thermal load 170 and the consumption ratio R7 of the thermal load 170. In the second calculation process of the computing step, a difference between a total energy, or the sum of the outputs (electric energy P1 and thermal energy Q1) of the CHP 110, the output (in this example, electric energy P21 and P22) of the RES 120, the output of the (thermal energy Q5) of the thermal energy supply system 150, and the electric energy P3 of the electric storage unit 130 and another total energy, or the sum of the uninterruptible electric and thermal energy consumption for energy demand, the electric energy consumption of the electric load 160, and the thermal energy consumption of the thermal load 170 is calculated as the output (electric energy Pp) of the electric power grid 200 and the thermal energy Q4 that can be supplied from the thermal accumulation unit 140. In the evaluation process, two or more candidates are evaluated using evaluation criteria including the energy supply cost (electric energy supply cost and thermal energy supply cost) based on a unit energy price, the outputs (electric energy P1 and thermal energy Q1) of the CHP 110, and the $CO_2$ emission and primary energy consumption based on the output (electric energy Pp) of the electric power grid 200 and the output (thermal energy Q5) of the thermal energy supply system 150. In the selection process, from the two or more energy balance candidates for each unit time, a most positive evaluation candidate is selected that yields the most positive evaluation when the convergence of the evaluation values of the two or more candidates has reached convergence criteria. In the output step (according to the output means PR3), the operational instructions C1, C2, C5, C3, C5, and C7 for each unit time based on the most positive evaluation candidate are transmitted respectively to the CHP 110, the RES 120, the thermal energy supply system 150, the electric storage unit 130, the electric load 160, and the thermal load 170. Therefore, the present embodiment is capable of reducing $CO_2$ emission and primary energy consumption, as well as energy supply cost, to lowest possible levels in optimal energy management.

Furthermore, in the present embodiment, an optimal scheduling for (combination of) the output ratios R1, R2, R5 and R3 of the CHP 110, the RES 120, the thermal energy supply system 150 and the electric storage 130 and the consumption ratios R6 and R7 of the electric load 160 and the thermal load 170 is found for the CHP 110, the RES 120, the thermal energy supply system 150, the electric storage 130, the electric load 160, and the thermal load 170 in accordance with input energy demand, unit energy price, and weather conditions by means of an objective function that takes into consideration energy supply cost, $CO_2$ emission, and primary energy consumption (in this example, to minimize the evaluation value obtained from the objective function) in residential facilities or industrial utilities. Hence, optimal operation conditions can be specified for the CHP 110, the RES 120, the thermal energy supply system 150, the electric storage unit 130, the electric load 160, and the thermal load 170.

In addition, in the present embodiment, the electric load 160 and the thermal load 170 can be classified into non-adjustable loads L1 that require uninterruptible energy consumption for energy demand, interruptible and adjustable loads L2, manageable loads L3 that are not allowed to discontinue their operation until a total operation time is reached once it starts to operate, and manageable loads L4 that, after starting to operate, may discontinue their operation if a total operation time is reached within a predetermined period. Hence, in the first calculation process, the calculations related to the energy consumption of the electric load 160 and the energy consumption of the thermal load 170 are carried out in a manner more suitable to the actual circumstances. Accordingly, the output (electric energy Pp) of the electric power grid 200 and the output (thermal energy Q4) supplied from the thermal accumulation unit 140 can be precisely calculated in the second calculation process.

As mentioned earlier, if a consumer fails to follow the electric power exchange profile, he/she is given a penalty from the utility company. The present embodiment is however capable of effectively preventing the consumer from being given a penalty from the utility company because the computing step (computing means PR2) includes as one of evaluation criteria how well the output (electric energy Pp) of the electric power grid 200 matches the electric power exchange profile, so that evaluation can be done on two or more electric power exchange profile candidates.

Genetic Algorithm

Figure 8:
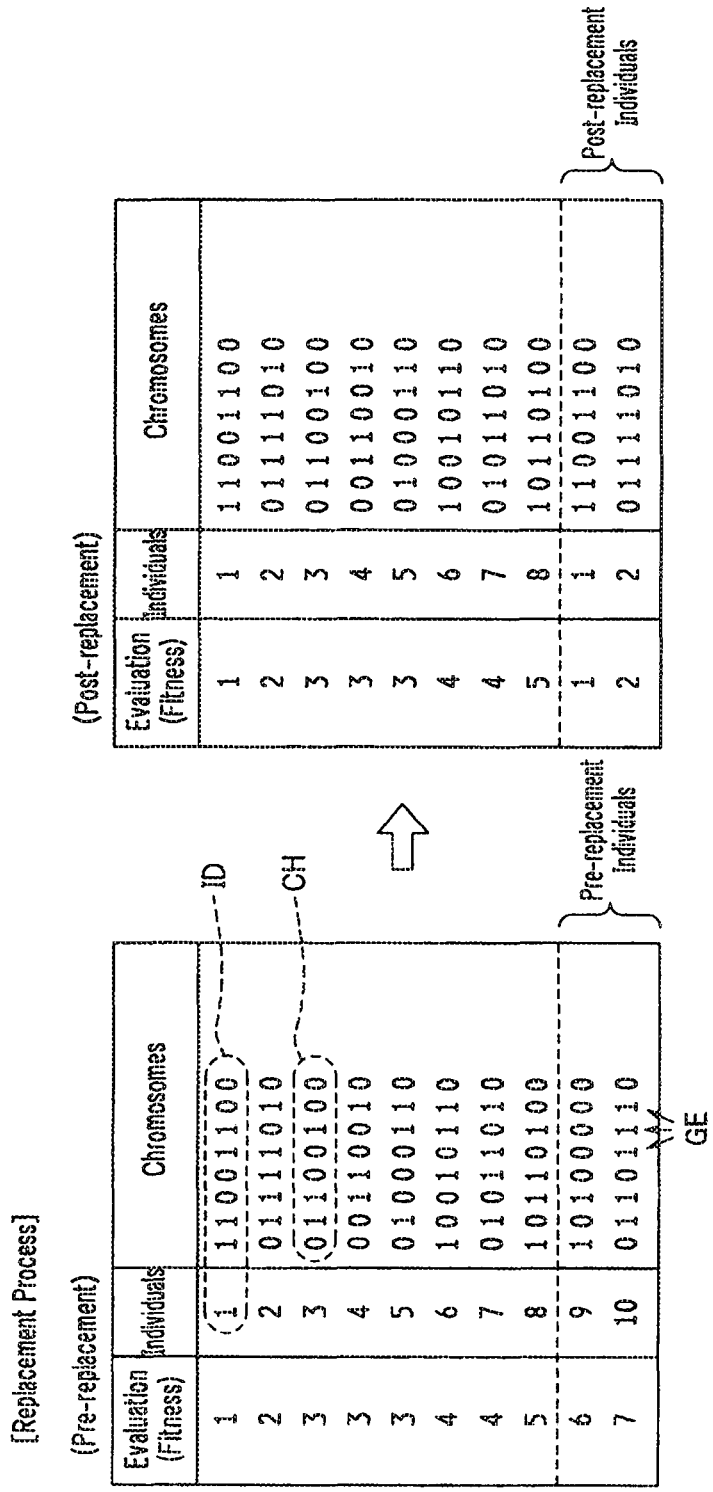
FIG. 8 is a schematic diagram illustrating an exemplary replacement process by which some individuals in a population are replaced, the left half showing the population before replacement, the right half showing the population after replacement.

According to the present embodiment, in the computing step, the output ratio R1 of the CHP 110, the output ratio R2 of the RES 120, the output ratio R5 of the thermal energy supply system 150, the output ratio R3 of the electric storage unit 130, the consumption ratio R6 of the electric load 160, and the consumption ratio R7 of the thermal load 170 are coded as parts of a chromosome CH including a predetermined number (division count DI: for example, $2^8=256$) of genes GE, two or more candidates are coded as individuals ID, and two or more individuals ID are repeatedly generated based on a genetic algorithm (see FIG. 8 which will be described later in detail).

Figure 6:
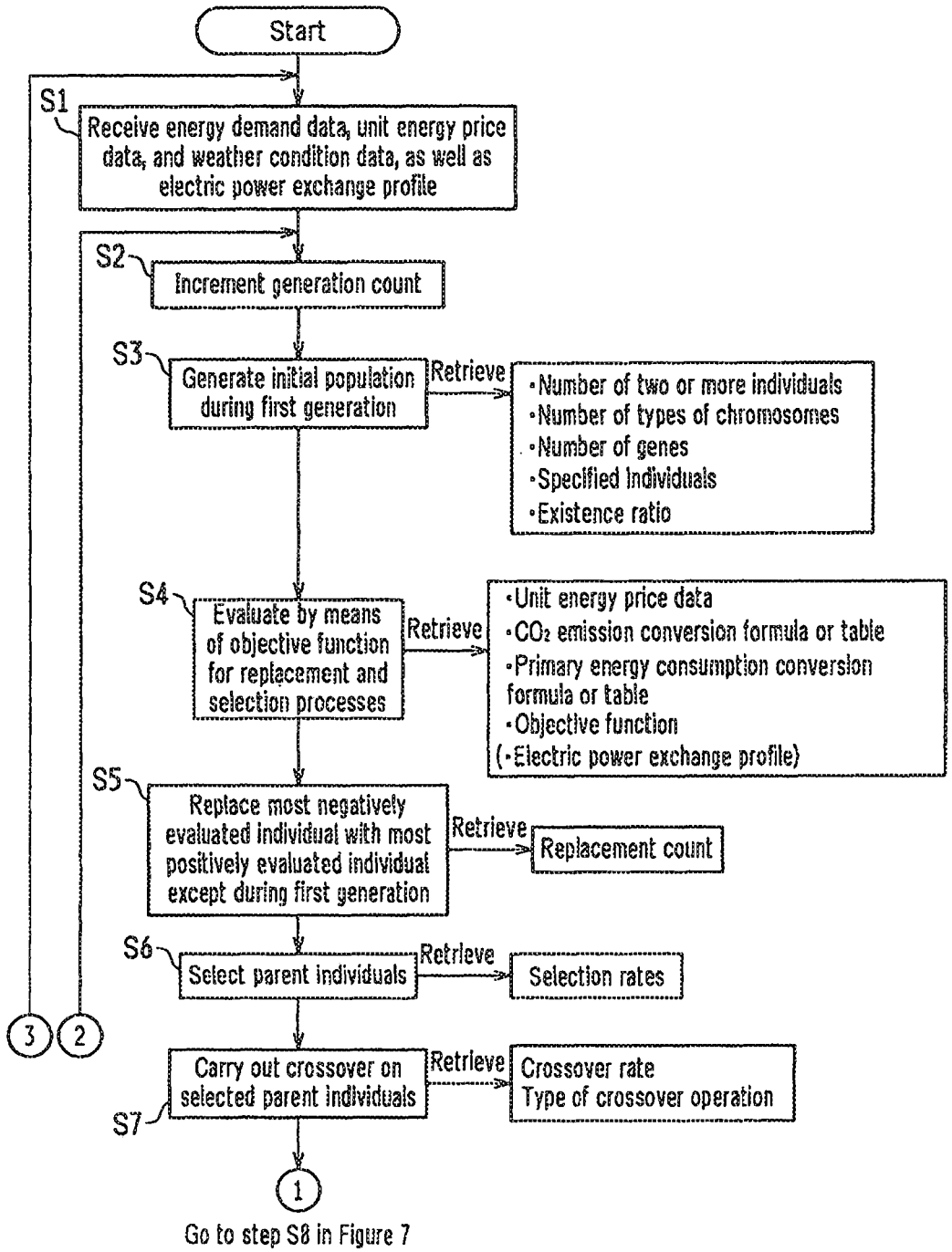
FIG. 6 is a flow chart representing a first half of an exemplary energy management optimization process performed according to a genetic algorithm by the control section in the control device shown in FIG. 5.
Figure 7:
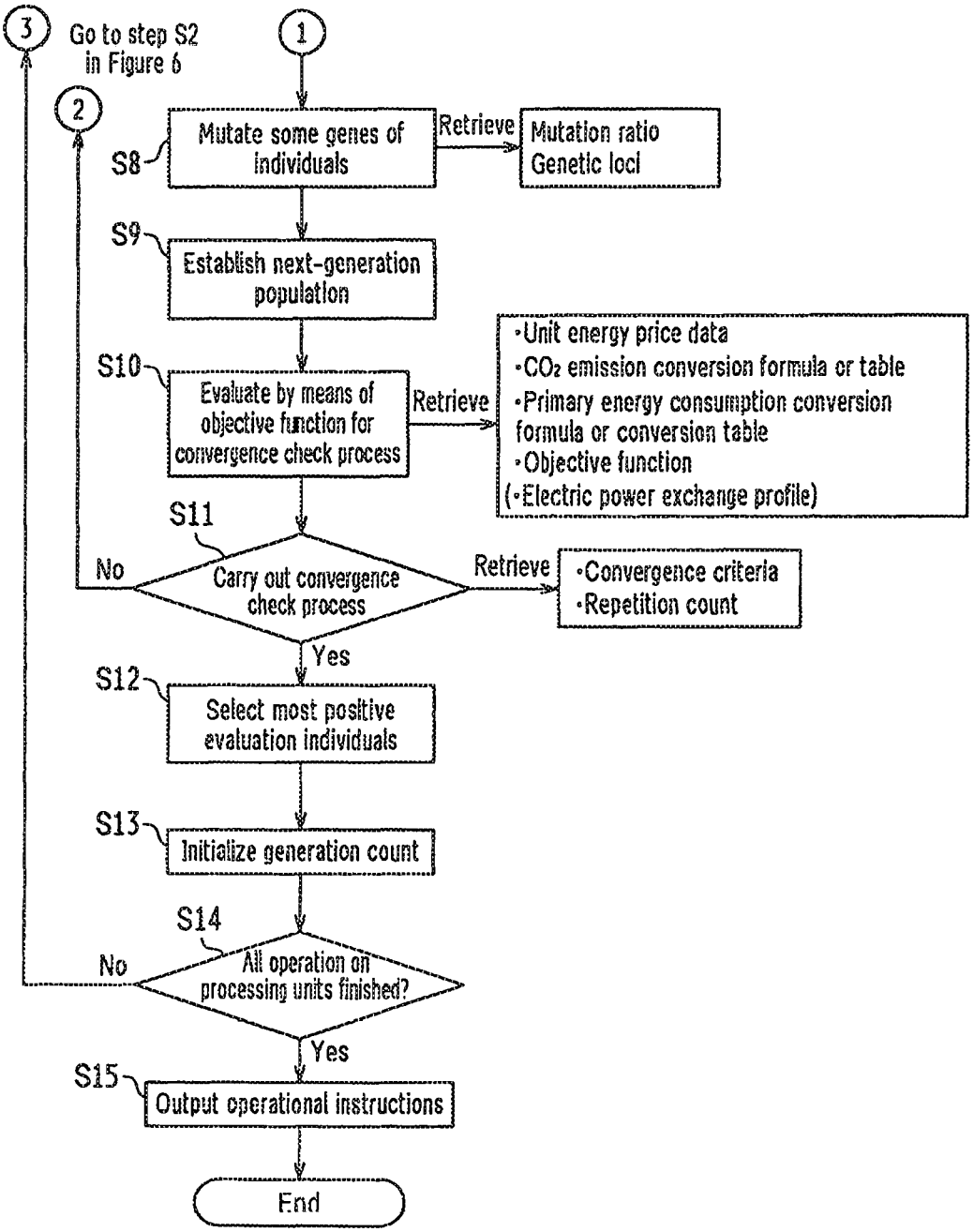
FIG. 7 is a flow chart representing a second half of the exemplary energy management optimization process performed according to a genetic algorithm by the control section in the control device shown in FIG. 5.

Referring to the flow charts shown in FIGS. 6 and 7, the following will describe a genetic algorithm followed by the control device 300 for the electric and thermal energy network 100 in accordance with an embodiment of the present invention.

FIGS. 6 and 7 are flow charts representing an exemplary energy management optimization process performed according to a genetic algorithm by the control section 330 in the control device 300 shown in FIG. 5. FIG. 6 represents a first half of the exemplary process, and FIG. 7 represents a second half of the exemplary process.

The control section 330 optimizes energy management a number of times that is equal to the number of processing units (e.g., 96 processing units) that is obtained by dividing the predetermined period of time to be processed (e.g., 1 day=24 hours) by the unit time UT (e.g., 15 minutes=0.25 hours) according to the genetic algorithm shown in FIGS. 6 and 7 (in this example, on the preceding day; specifically, collectively some time on December 24 so that the optimization is completed by 00:00:00 of December 25) before a forecast period for the energy demand data DT1 and the weather condition data DT3 (e.g., from 00:00:00 to 23:59:59 of December 25).

In this genetic algorithm, a set of two or more candidates is termed a population PP (group of individuals), and each candidate in the population PP is termed an individual ID.

Prior to implementing the genetic algorithm shown in FIG. 6, the following set of data is specified (stored) in advance in the memory section 340: the number of two or more individuals ID in the population PP (e.g., 1,000), the number of types of chromosomes CH (e.g., 12, or the sum of the "two" types of output ratios R11 and R12 of the CHP 110, the "two" types of output ratios R21 and R22 of the RES 120, the "one" type of output ratio R5 of the thermal energy supply system 150, the "one" type of output ratio R3 of the electric storage 130, the "three" types of consumption ratios R62 to R64 of the electric load 160, and the "three" types of consumption ratios R72 to R74 of the thermal load 170), and the number of genes GE (e.g., 256=8 bits in binary form, or the division count DI for the output ratios R11 and R12 of the CHP 110, the output ratios R21 and R22 of the RES 120, the output ratio R5 of the thermal energy supply system 150, the output ratio R3 of the electric storage 130, the consumption ratios R62 to R64 of the electric load 160, and the consumption ratios R72 to R74 of the thermal load 170). Specified individuals ID and an existence ratio, a replacement count, a selection rate, a crossover rate and the type of the crossover operation, a mutation ratio and genetic loci, and convergence criteria and a repetition count, all of which will be described later in detail, are also specified (stored) in advance in the memory section 340. The control device 300 allows the user to readily specify these values and conditions. This arrangement enables the control device 300 to be readily applicable to environments in residential facilities or industrial utilities in which the electric and thermal energy network 100 is installed.

Step S1: Data Input

First of all, as illustrated in FIG. 6, the control section 330 receives energy demand data DT1 for each unit time UT (e.g., 15 minutes) related to forecast energy demand, unit energy price data DT2 for each unit time UT (e.g., 15 minutes) related to unit energy price, and weather condition data DT3 for each unit time UT (e.g., 15 minutes) related to forecast weather conditions of the geographical region covered by the electric and thermal energy network 100 (step S1). In this example, the control section 330 also receives the electric power exchange profile of the electric power grid 200 in step S1 as part of the energy demand data DT1 for each unit time UT (e.g., 15 minutes).

Specifically, the control section 330 obtains, as the energy demand data DT1, the forecast electric power demand, forecast thermal energy demand, and electric power exchange profile directly input by the user through the input section 310. The control section 330 automatically obtains, as the unit energy price data DT2, a unit electric energy price and a unit thermal energy price from a Web site on the Internet 400. The control section 330 automatically obtains, as the weather condition data DT3, the angle of the sun and cloudiness in the geographical region where the photovoltaic device 121 is installed and the wind direction and speed in the geographical region where the wind-powered electric generator 122 is installed from a Web site on the Internet 400.

Step S2: Incrementing Generation Count

Next, the control section 330 increments a generation count G (initial value is equal to 0) (increases a generation count G by one; G=G 1) (step S2).

Step S3: Generating Initial Population

Next, the control section 330, during the first generation (G=1), generates an initial (first generation) population PP from all combinations of the output ratios R11 and R12 of the CHP 110, the output ratios R2 and R22 of the RES 120, the output ratio R5 of the thermal energy supply system 160, the output ratio R3 of the electric storage unit 130, the consumption ratios R62 to R64 of the electric load 160, and the consumption ratios R72 to R74 of the thermal load 170 (step S3). The control section 330 stores the generated population PP in the memory section 340.

Specifically, the control section 330 selects two or more (e.g., 1,000) individuals ID, as the initial population PP, from all the individuals (e.g., $2^{96}$ individuals=$256^{12}$ individuals), that is, all the combinations of as many electric and thermal energy output ratios R11 and R12 of the CHP 110 as the division count DI (e.g., $2^8$=256) by which the entire output range of the CHP 110 is divided, as many output ratios R21 and R22 of the RES 120 (in this example, photovoltaic device 121 and wind-powered electric generator 122) as the division count DI by which the entire output range of the RES 120 is divided, as many output ratio R5 of the thermal energy supply system 150 as the division count DI by which the entire output range of the thermal energy supply system 150 is divided, as many output ratio R3 of the electric storage unit 130 as the division count DI by which the entire output range of the electric storage unit is divided, as many consumption ratios R62 to R64 of the electric load 160 (the second load L2 to the fourth load L4) as the division count DI by which the entire consumption range of the electric load 160 is divided, and as many consumption ratios R72 to R74 of the thermal load 170 (the second load L2 to the fourth load LA) as the division count DI by which the entire consumption range of the thermal load 170 is divided, so that the initial population PP can have statistically viable variance (specifically, the initial population PP has randomness).

Furthermore, the control section 330 deliberately specifies predetermined individuals that are to exist in advance at a predetermined existence ratio in the initial population PP. For example, when there are 1,000 individuals ID with an existence ratio of 5%, 50 out of the 1,000 individuals ID are the specified individuals existent in advance.

In the present embodiment, for example, the specified individuals consist of the following three types of individuals.

1. Individuals that lead to electric power-led operation of the CHP 110 (the CHP 110 is operated following the electric power demand by the electric load 160)

2. Individuals that lead to thermal power-led operation of the CHP 110 (the CHP 110 is operated following the thermal power demand by the thermal load 170)

3. Individuals that lead to such operation of the CRP 110 and the RES 120 that all the electric power demand of the electric load 160 is fulfilled by the supply of electric energy Pp from the electric power grid 200 and all the thermal power demand of the thermal load 170 is fulfilled by the supply of thermal energy Q5 from the thermal energy supply system 150.

To do this, the control section 330 refers to the memory section 340 to retrieve the number (e.g., 1,000) of the two or more (e.g., 1,000) individuals ID, the number of types of chromosomes CH (in this example, 10 (types)), the number of genes GE (e.g., 8 bits in binary form), the specified individuals existent in advance (in this example, three types of individuals), and the existence ratio of the specified individuals to the individuals ID in the population PP, all being stored in the memory section 340.

Step S4: Evaluation for Replacement Process and Selection Process

Next, the control section 330 evaluates two or more (e.g., 1,000) individuals ID in the current generation population PP by means of an objective function to carry out a replacement process in step S5 and a selection process in step S6 (step S4).

Specifically, the control section 330 determines evaluation values for the two or more (e.g., 1,000) individuals ID either by plugging in their energy supply costs, $CO_2$ emissions, and primary energy consumptions into a predetermined evaluation formula in the evaluation process or by ranking the energy supply costs, $CO_2$ emissions, and primary energy consumptions and summing up the rank of the energy supply cost, the rank of the $CO_2$ emission, and the rank of the primary energy consumption for each individual ID in the evaluation process. In addition, in this example, the control section 330 incorporates the electric power exchange profile as one of evaluation criteria; therefore, the control section 330 yields a progressively positive evaluation to a better matching between the total electric energy output Pp of the electric power grid 200 and the electric power demand in the electric power exchange profile (e.g., if a smaller evaluation value represents a progressively positive evaluation, the evaluation value is multiplied by an evaluation ratio that decreases with a better matching).

To do this, the control section 330 refers to the memory section 340 to retrieve the unit energy price data DT2, the $CO_2$ emission conversion formula or table, the primary energy consumption conversion formula or table, the objective function, and the electric power exchange profile, all stored in the memory section 340.

Step S5: Replacing Most Negatively Evaluated Individuals with Most Positively Evaluated Individuals Next, except for the first generation (G=1), the control section 330 carries out a replacement process of replacing most negatively evaluated individuals with most positively evaluated individuals of the two or more (e.g., 1,000) individuals ID in the population PP based on the evaluation (fitness) obtained in step S4 (step S5). The control section 330 then stores the post-replacement population PP in the memory section 340.

FIG. 8 is a schematic diagram illustrating an exemplary replacement process by which some of the individuals ID in the population PP are replaced, the left half showing the population before replacement, the right half showing the population after replacement. Note that in the example shown in FIG. 8, for ease of description, the two or more individuals ID include ten individuals in the population PP, and the evaluation values (fitness) of the ten individuals 1 to 10 are given as 1, 2, 3, 3, 3, 4, 4, 5, 6, and 7. The evaluation is progressively positive with a smaller value. That applies to FIGS. 9 and 10, which will be described later in detail.

Specifically, as illustrated in FIG. 8, the control section 330 replaces as many individuals that were most negatively evaluated (fitness) in step S4 as the predetermined replacement count (two in the example shown in FIG. 8: individual [9] evaluated "6" and individual [10] evaluated "7" in the example shown in FIG. 8) out of the two or more (ten in the example shown in FIG. 8) individuals ID with as many individuals that were most positively evaluated as the replacement count (two in the example shown in FIG. 8: individual. [1] evaluated "1" and individual [2] evaluated "2" in the example shown in FIG. 8).

To do this, the control section 330 refers to the memory section 340 to retrieve the predetermined replacement count (in this example, two) stored in the memory section 340.

Step S6: Selecting Parent Individuals

Next, the control section 330 carries out a selection process of selecting parent individuals from the two or more (e.g., 1,000) individuals ID in the population PP based on the evaluation (fitness) obtained in step S4 (step S6). The control section 330 stores the selected population PP in the memory section 340.

Figure 9:
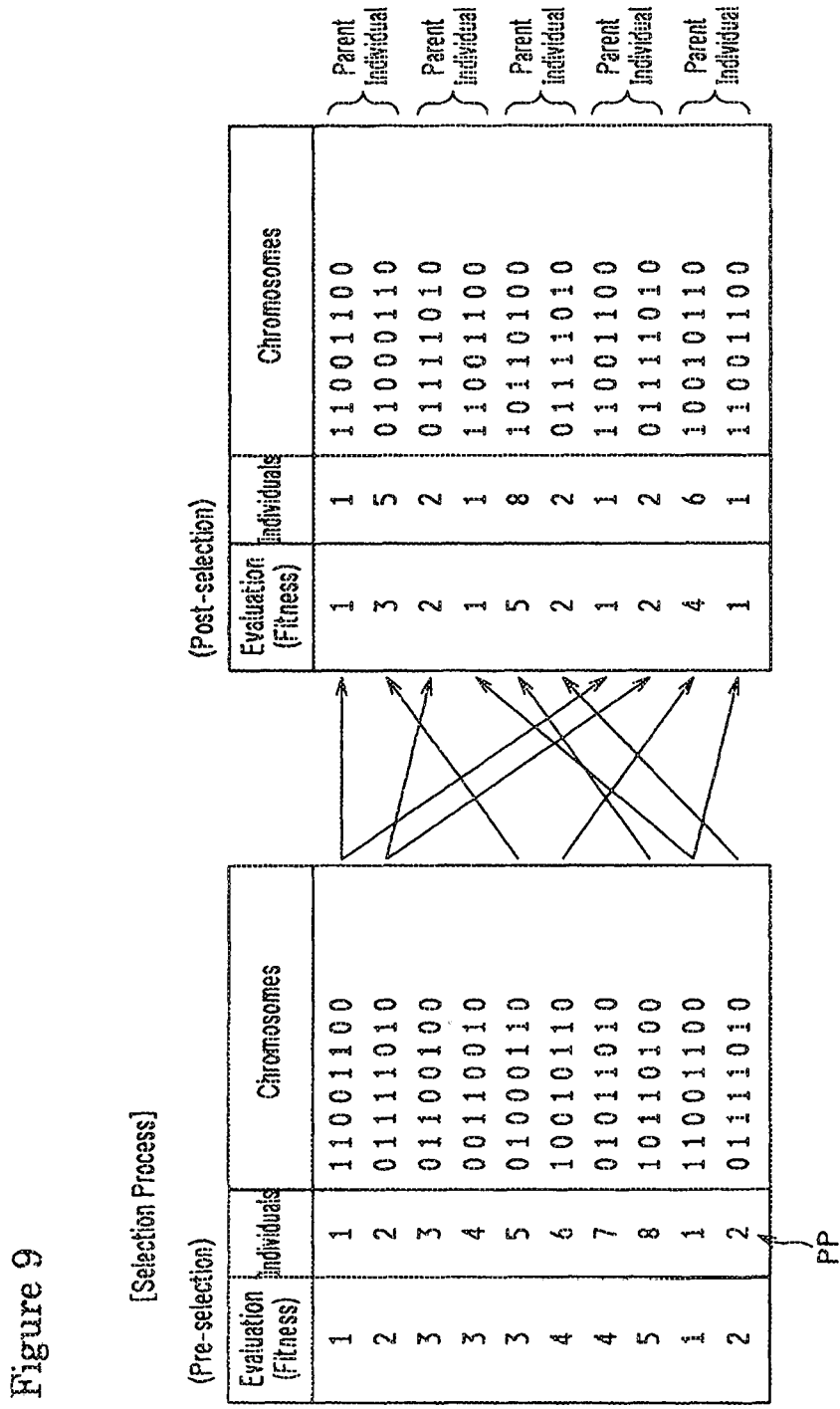
FIG. 9 is a schematic diagram illustrating an exemplary selection process by which parents are selected from two or more individuals in a population, the left half showing the population before selection, the right half showing the population after selection.

FIG. 9 is a schematic diagram illustrating an exemplary selection process by which parent individuals are selected from two or more individuals ID in the population PP, the left half showing the population before selection, the right half showing the population after selection.

Specifically, as illustrated in FIG. 9, the control section 330 selects parent individuals (5 sets of parents in the example shown in FIG. 9) from two or more (ten in the example shown in FIG. 9) individuals ID so that relatively positively evaluated individuals are more likely to be selected as parent individuals whereas relatively negatively evaluated individuals are less likely to be selected as parent individuals. This selection process may be any publicly known, conventional selection process and may typically be a roulette selection process, a ranking selection process, a tournament selection process, or an elite selection process. The roulette selection process utilizes a roulette wheel prepared according to predetermined selection rates that are proportional to evaluation values, to enable a random selection.

Figure 10:
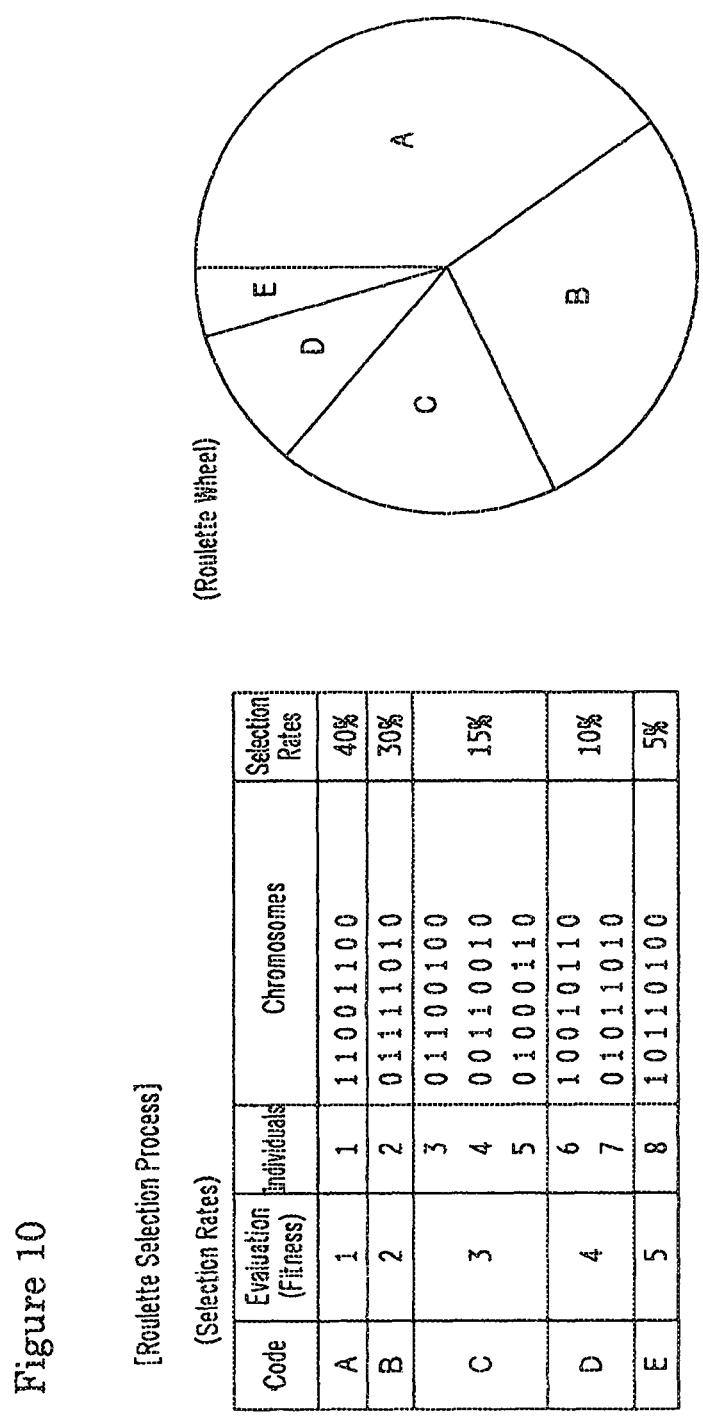
FIG. 10 is a diagram illustrating an exemplary roulette selection process, the left half showing selection rates, the right half showing a roulette wheel prepared according to the selection rates.

FIG. 10 is a diagram illustrating an exemplary roulette selection process, the left half showing selection rates, the right half showing a roulette wheel prepared according to the selection rates.

As an example, suppose that ten individuals 1, 2, 3, 4, 5, 6, 7, 8, 1, and 2 before a selection process are evaluated 1, 2, 3, 3, 3, 4, 4, 5, 1, and 2 respectively as shown in the left half of FIG. 9 and given selection rates 40% (evaluation "1"), 30% (evaluation "2"), 15% (evaluation "3"), 10% (evaluation "4"), and 5% (evaluation "5") as shown in the left half of FIG. 10. A roulette wheel is prepared using these selection rates as shown in the right half of FIG. 10. Since there are ten individuals, the roulette wheel is, for example, rotated 10 times to select ten post-selection individuals 1, 5, 2, 1, 8, 2, 1, 2, 6, and 1 shown in the right half of FIG. 9.

To do this, the control section 330 refers to the memory section 340 to retrieve the selection rates stored in the memory section 340.

Step S7: Crossover of Selected Parent Individuals

Next, the control section 330 carries out a crossover operation of exchanging some of the genes GE between arbitrarily (specifically, randomly) selected parent individuals (two individuals or chromosomes CH) at a predetermined crossover rate, or a probability at which the parent individuals selected in step S6 undergo crossover, to generate children (two next-generation individuals) (step S7). This process generates children that possess some of the parent individuals' genes GE. A next-generation population PP is obtained in this manner. The control section 330 then stores the generated next-generation population PP in the memory section 340. In addition, the control section 330 leaves the current generation population. PP selected in the selection process in step S7, as well as the next-generation population PP, in the memory section 340.

Specifically, the control section 330 exchanges some genes GE between the parent individuals (two individuals) at one or multiple crossover points to generate children (two next-generation individuals). This crossover operation may be a publicly known, conventional crossover operation and may be typically one-point crossover, multiple-point crossover, or uniform crossover. One-point crossover is an operation of randomly designating a single site as a crossover point in the chromosomes CH and exchanging the genes GE preceding or succeeding those sites between the parent individuals. Multiple-point crossover is an operation randomly designating a plurality of sites as crossover points in the chromosomes CH and exchanging the genes GE preceding or succeeding those sites between the parent individuals. Multiple-point crossover is typically two-point crossover. The control section 330, in the present embodiment, allows the user to specify any one of crossover operations: one-point crossover and two-point crossover.

Figure 11:
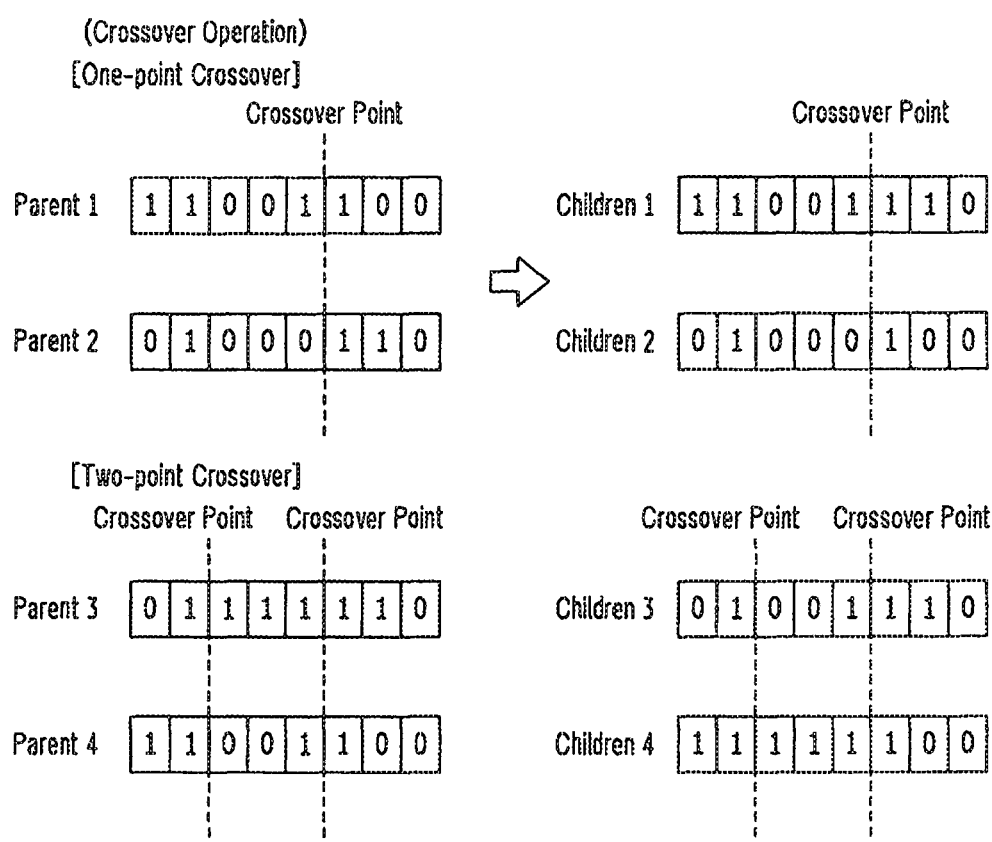
FIG. 11 is a schematic diagram illustrating an exemplary one-point crossover operation and an exemplary two-point crossover operation, the upper half showing a one-point crossover operation, the lower half showing a two-point crossover operation.

FIG. 11 is a schematic diagram illustrating an exemplary one-point crossover operation and an exemplary two-point crossover operation, the upper half showing a one-point crossover operation, the lower half showing a two-point crossover operation. In the examples shown in FIG. 11, there are provided eight (8 bits in binary form) genes GE in each individual ID for ease of description.

In the one-point crossover operation example shown in the upper half of FIG. 11, with the crossover point being located between the fifth and sixth bits from the left, the genes GE either from the first to fifth bits or from the sixth to eighth bits are exchanged between the parent individuals (two individuals).

In the two-point crossover operation example shown in the lower half of FIG. 11, with one of the crossover points being located between the second and third bits from the left and the other crossover point being located between the fifth and sixth bits from the left, the genes GE either from the third to fifth bits or from the first to second bits and from the sixth to eighth bits are exchanged between the parent individuals (two individuals).

To do this, the control section 330 refers to the memory section 340 to retrieve the crossover rate and the type of crossover operation (in this example, either one-point crossover or two-point crossover), both stored in the memory section 340.

Step S8: Gene Mutation in Individuals

Figure 12:
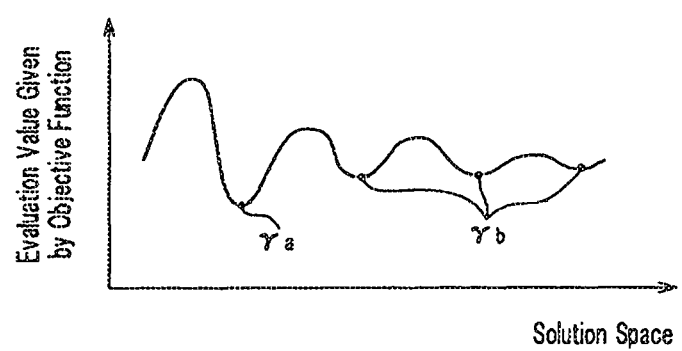
FIG. 12 is an illustration of local solutions that are likely to be found other than an optimal solution during the generation of a next-generation population.

FIG. 12 is an illustration of local solutions γb that are likely to be found along with an optimal solution γa during the generation of a next-generation population.

If the control section 330 was capable only of crossover operations, limited child variants would be generated depending on the genes GE of the parent individuals. If so, the control section 330 could fail to give diversity to the population PP, and the algorithm would likely come up with a local solution (see γb in FIG. 12) that is not the desirable optimal solution (see γa in FIG. 12).

Regarding this point, however, the control section 330 carries out a mutation operation of replacing some of the genes GE in an arbitrarily (specifically, randomly) selected individual II) (chromosome CH) with their allelic genes at a predetermined mutation ratio, or a probability at which a mutation occurs in a next-generation population PP that has undergone the selection operation in step S6 and the crossover operation in step S7 as illustrated in FIG. 7 (step S8). This operation gives diversity to the population PP, hence preventing the algorithm from coming up with a local solution that is not the desirable optimal solution.

Specifically, the control section 330 changes the value of a selected gene GE in a parent individual (chromosome CH) to a different value (e.g., reverses the selected bit in binary form). The mutation operation may be a publicly known, conventional mutation operation and may be typically a single-locus mutation operation, an inversion operation, or a translocation operation. Single-locus mutation is an operation of replacing a gene with its allelic gene at a single genetic locus. In the present embodiment, the control section 330 allows the user to specify genetic loci in a mutation operation.

Figure 13:
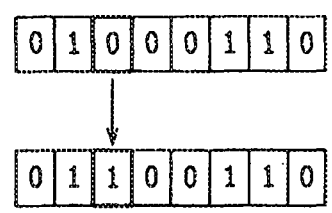
FIG. 13 is a schematic diagram illustrating an exemplary single-locus mutation operation.

FIG. 13 is a schematic diagram illustrating an exemplary single-locus mutation operation. In the example shown in FIG. 13, there are provided eight (8 bits in binary form) genes GE in an individual ID for ease of description.

In the single-locus mutation operation example shown in FIG. 13, the 0 in the third bit (genetic locus) is reversed to a 1.

To do this, the control section 330 refers to the memory section 340 to retrieve the mutation ratio and the genetic locus (in this example, the third bit), both stored in the memory section 340.

Step S9: Establishing Next-Generation Population

Next, the control section 330 establishes a next-generation population PP that has undergone the crossover operation in step S7 and the mutation operation in step S8 (step S9). The control section 330 then stores the established next-generation population PP in the memory section 340.

Step S10: Evaluation to Check Convergence

Next, the control section 330 evaluates two or more (e.g., 1,000) individuals ID in the current generation population PP obtained in step S7 by means of an objective function to carry out a convergence check process in step S11 (step S10).

Specifically, the control section 330 determines evaluation values for the two or more (e.g., 1,000) individuals ID either by plugging in their energy supply costs, $CO_2$ emissions, and primary energy consumptions into a predetermined evaluation formula in the evaluation process or by ranking the energy supply costs, $CO_2$ emissions, and primary energy consumptions and summing up the rank of the energy supply cost, the rank of the $CO_2$ emission, and the rank of the primary energy consumption for each individual ID in the evaluation process. In addition, in this example, the control section 330 incorporates the electric power exchange profile as one of evaluation criteria; therefore, the control section 330 yields a progressively positive evaluation to a better matching between the total electric energy output Pp of the electric power grid 200 and the electric power demand in the electric power exchange profile (e.g., if a smaller evaluation value represents a progressively positive evaluation, the evaluation value is multiplied by an evaluation ratio that decreases with a better matching).

To do this, the control section 330 refers to the memory section 340 to retrieve the unit energy price data DT2, the $CO_2$ emission conversion formula or table, the primary energy consumption conversion formula or table, the objective function, and the electric power exchange profile, all stored in the memory section 340.

Step S11: Convergence Check Process

Next, the control section 330 carries out a convergence check process of determining whether or not the changes of the evaluation values (fitness) of the two or more (e.g., 1,000) candidates in the current generation population PP evaluated in step S10 have reached convergence criteria and whether or not the generation count G has reached a predetermined repetition count (step S11). If the convergence of the evaluation values has not reached the convergence criteria and the generation count G has not reached the predetermined repetition count ("No" in step S11), the control section 330 proceeds to and carries out step S2 shown in FIG. 6 with the next-generation population PP established in step S9 being designated as the current generation population PP and repeats steps S2 to S11. At least either if the convergence of the evaluation values has reached the convergence criteria or if the generation count G has reached the predetermined repetition count ("Yes" in step S11), the control section 330 proceeds to and carries out step S12.

To do this, the control section 330 retrieves the predetermined convergence criteria and the predetermined repetition count.

Step S12: Selecting Most Positive Evaluation Individual

Next, the control section 330 selects a most positive evaluation individual that is to be a most positively evaluated (best fitness) individual (step S12).

Step S13: Initializing Generation Count

Next, the control section 330 initializes the generation count G (sets the generation count G to 0) (step S13).

Step S14: Operations for Each Processing Unit

Next, the control section 330 carries out steps S1 to S14 of the genetic algorithm for each processing unit (e.g., 96 processing units) every unit time UT (e.g., 15 minutes) ("No" in step S14).

Step S15: Output of Operational Instructions

When the operations for each processing unit have ended ("Yes" in step S14), the control section 330 transmits (outputs), respectively to the CHP 110, the RES 120 (121, 122), the thermal energy supply system 150, the electric storage unit 130, the electric load 160 (from the second load L2 to the fourth load L4), and the thermal load 170 (from the second load L2 to the fourth load LA), operational instructions C1 (C11 and C12), C2 (C21 and C22), C5, C3, C6 (C62 to C64), and C7 (C72 to C74) corresponding to a combination (for each unit time UT) of the output ratios R1 (R11 and R12) of the CHP 110, the output ratios R2 (R21 and R22) of the RES 120, the output ratio R5 of the thermal energy supply system 150, the output ratio R3 of the electric storage unit 130, the consumption ratios R6 (R62 to R64) of the electric load 160, and the consumption ratios R7 (R72 to R74) of the thermal load 170, in accordance with a processing unit (e.g., 96 processing units) for a corresponding unit time UT (e.g., 15 minutes) before a forecast period (e.g., from 23:45:00 to 23:59:59 of the preceding day, or December 24, to 23:44:59 of the day of interest, or December 25) (step S15), the combination yielding the most positive evaluation individual. Then, the control section 330 ends the genetic algorithm.

As explained above, in the present embodiment, the computing step (computing means) is capable of converging the convergence of the evaluation values of the two or more individuals within the convergence criteria in a short period of time, by coding the output ratio R1 of the CHP 110, the output ratio R2 of the RES 120, the output ratio R5 of the thermal energy supply system 150, the output ratio R3 of the electric storage unit 130, the consumption ratio R6 of the electric load 160, and the consumption ratio R7 of the thermal load 170 into a chromosome CH, coding two or more (e.g., 1,000) candidates into individuals ID, and repeatedly generating two or more (e.g., 1,000) individuals ID according to a genetic algorithm.

The present invention is by no means limited to the foregoing embodiments and may be implemented in many other forms. Therefore, the embodiments are merely illustrative in every point and should not be interpreted in a limiting manner. The scope of the present invention is defined in the claims and is by no means bound by the specification at all. Furthermore, the scope of the present invention encompasses all the changes and modifications that are equivalents of the claims.

INDUSTRIAL APPLICABILITY

The present invention relates to control devices for an electric and thermal energy network connecting combined heat and power systems (CA's), renewable energy sources (RES's), electric storage units, thermal accumulation units, an electric power grid, thermal energy supply systems, electric loads, and thermal loads and is especially applicable to uses where energy supply cost, $CO_2$ emission, and primary energy consumption should be reduced to lowest possible levels in optimal energy management.

REFERENCE SIGNS LIST

100 Thermal energy network
111 Open/close valve
112 Gas engine
113 Electric power generator
114 Electric power converter for electric power generator
115 AC circuit breaker
116 Waste heat recovery boiler
117 Adjusting valve
121 Photovoltaic device
121a Solar cell panel
121b Photovoltaic cell-use inverter
12k AC circuit breaker
122 Wind-powered electric generator
122a Wind turbine
122b Wind-generated electric power converter
122c AC circuit breaker
130 Electric storage unit
131 Rechargeable battery
132 Electric storage-use inverter
133 AC circuit breaker
140 Thermal accumulation unit
141 Thermal accumulator
142 Thermal energy regulation section
150 Thermal energy supply system
151 Fuel flow rate regulation valve
152 Boiler
153 Adjusting valve
160 Electric load
170 Thermal load
200 Electric power grid
210 Central power plant
220 Residential facilities
221 General household
230 Industrial utilities
231 Office
232 Factories
240 Wind power plant
250 Electric vehicle
270 Electric storage unit
280 Fuel cell
290 Wind-powered plant
300 Control device
310 Input section
320 Display section
330 Control section
340 Memory section
341 Volatile memory
342 Non-volatile memory
350 First reading section
360 Second reading section
400 Internet
C1 Operational instruction
C11 Operational instruction
C12 Operational instruction
C2 Operational instruction
C21 Operational instruction
C22 Operational instruction
C3 Operational instruction
C5 Operational instruction
C6 Operational instruction
C62 Operational instruction
C63 Operational instruction
C64 Operational instruction
C72 Operational instruction
C73 Operational instruction
C74 Operational instruction
CH Chromosome
DT1 Energy demand data
DT2 Unit energy price data
DT3 Weather condition data
F Fuel supply source
GE Gene
ID Individual
L1 First load
L2 Second load
L3 Third load
IA Fourth load
M Storage medium
ME External storage medium
P1 Electric energy
P2 Electric energy
P3 Electric energy
PL Electric power supply line PP Population
PR Computer program
PR1 Input means
PR2 Computing means
PR3 Output means
Q1 Thermal energy
Q4 Thermal energy
Q5 Thermal energy
TL Heat supply line

The invention claimed is:

1. A control device for an electric and thermal energy network connecting a combined heat and power system (CHP), a renewable energy source (RES), an electric storage unit, a thermal accumulation unit, an electric power grid, a thermal energy supply system, an electric load, and a thermal load, the control device comprising:

input means configured to receive a forecast energy demand, a unit energy price, and a forecast weather condition for a geographical region covered by the electric and thermal energy network;

computing means configured to repeatedly generate two or more energy balance candidates for each unit time for an output of the electric power grid and an output of the thermal accumulation unit based on combinations of varied values of an output ratio of the CHP, an output ratio of the RES, an output ratio of the thermal energy supply system, an output ratio of the electric storage unit, a consumption ratio of the electric load, and a consumption ratio of the thermal load, until convergence of evaluation values of the two or more energy balance candidates reaches a predetermined convergence criterion; and output means configured to transmit, to the CHP, the RES, the thermal energy supply system, the electric storage unit, the electric load, and the thermal load, respective operational instructions for each unit time to instruct the CHP, the RES, the thermal energy supply system, the electric storage unit, the electric load, and the thermal load to control the output ratio of the CHP, the output ratio of the RES, the output ratio of the thermal energy supply system, the output ratio of the electric storage unit, the consumption ratio of the electric load, and the consumption ratio of the thermal load, wherein the computing means is further configured to implement:

a first calculation process in which the computing means is configured to calculate an output of the CHP from a rated output of the CHP and the output ratio of the CHP, to calculate an output of the RES from a maximum output of the RES and the output ratio of the RES, the maximum output of the RES being based on a weather condition, to calculate an output of the thermal energy supply system from a rated output of the thermal energy supply system and the output ratio of the thermal energy supply system, to calculate an output of the electric storage unit from a maximum output of the electric storage unit and the output ratio of the electric storage unit, the maximum output of the electric storage unit being based on a state of charge, to calculate an energy consumption of the electric load from a rated power consumption of the electric load and the consumption ratio of the electric load, and to calculate an energy consumption of the thermal load from a rated power consumption of the thermal load and the consumption ratio of the thermal load;

a second calculation process in which the computing means is configured to calculate a difference between a sum of the output of the CHP, the output of the RES, the output of the thermal energy supply system, and the output of the electric storage unit, and a sum of an uninterruptible energy consumption for energy demand, the energy consumption of the electric load, and the energy consumption of the thermal load as the output of the electric power grid and the output of the thermal accumulation unit;

an evaluation process in which the computing means is configured to plug in energy supply costs, $CO_2$ emissions, and primary energy consumptions into an evaluation criterion to evaluate the two or more energy balance candidates for each unit time, the energy supply costs being based on the unit energy price, the evaluation criterion comprising a summing of rankings of the energy supply costs, the $CO_2$ emissions, and the primary energy consumptions; and a selection process in which the computing means is configured to select, from the two or more energy balance candidates for each unit time, a most positive evaluation candidate that is most positively evaluated when the convergence of the evaluation values of the two or more candidates has reached the predetermined convergence criterion, wherein the output means is configured to transmit respective operational instructions for each unit time based on the most positive evaluation candidate to the CHP, the RES, the thermal energy supply system, the electric storage unit, the electric load, and the thermal load.

2. The control device of claim 1, wherein the computing means is further configured to code the output ratio of the CHP, the output ratio of the RES, the output ratio of the thermal energy supply system, the output ratio of the electric storage unit, the consumption ratio of the electric load, and the consumption ratio of the thermal load into a chromosome containing a predetermined number of genes, to code the two or more energy balance candidates into individuals, and to repeatedly generate two or more individuals based on a genetic algorithm.

3. The control device of claim 2, wherein the electric and thermal loads are classified into four categories L1 to L4:

L1: non-adjustable loads that consume the uninterruptible energy consumption for energy demand;

L2: interruptible and adjustable loads;

L3: manageable loads that are not allowed to discontinue their operation until a total operation time is reached once they start to operate; and L4: manageable loads that are, after starting to operate, allowed to discontinue their operation if a total operation time is reached within a predetermined period of time.

4. The control device of claim 3, wherein:

the input means is further configured to receive an electric power exchange profile of the electric power grid as an energy demand; and the computing means is further configured to use matching between the output of the electric power grid and the electric power exchange profile as an additional evaluation criterion.

5. The control device of claim 3, wherein:
an uninterruptible electric energy consumption given in the forecast energy demand is electric energy consumed by a first load classified as L1 which is part of the electric load, and
an uninterruptable thermal energy consumption given in the forecast energy demand is thermal energy consumed by a first load classified as L1 which is part of the thermal load.

6. The control device of claim 5, wherein in an output step, as the most positive evaluation candidate for each unit time obtained in the selection process, the operational instructions corresponding respectively to the consumption ratios of a second load classified as L2 that is part of the electric load are transmitted to the second load of the electric load when the second load of the electric load is to consume the electric energy, the operational instructions corresponding respectively to the consumption ratios of a third load classified as L3 that is part of the electric load are transmitted to the third load of the electric load when the third load of the electric load is to consume electric energy, and the operational instructions corresponding respectively to the consumption ratios of a fourth load classified as L4 that is part of the electric load are transmitted to the fourth load of the electric load when the fourth load of the electric load is to consume electric energy.

7. The control device of claim 6, wherein, in the output step, as the most positive evaluation candidate for each unit time obtained in the selection process, the operational instructions corresponding respectively to the consumption ratios of a second load classified as L2 that is part of the thermal load are transmitted to the second load of the thermal load when the second load of the thermal load is to consume thermal energy, the operational instructions corresponding respectively to the consumption ratios of a third load classified as L3 that is part of the thermal load are transmitted to the third load of the thermal load when the third load of the thermal load is to consume thermal energy, and the operational instructions corresponding respectively to the consumption ratios of a fourth load classified as L4 that is part of the thermal load are transmitted to the fourth load of the thermal load when the fourth load is to consume thermal energy.

8. The control device of claim 7, wherein:
the electric power grid is configured to cover an electric energy shortage in view of a total electric energy corresponding to a sum of the uninterruptible electric energy consumption of the first load of the electric load given in the forecast energy demand and electric energy consumption of the second load of the electric load, the third load of the electric load, and the fourth load of the electric load, and another total electric energy corresponding to a sum of an electric energy supply from the CHP, an electric energy supply from the RES, and an electric energy supply from the electric storage unit, and
the thermal accumulation unit is configured to cover a thermal energy shortage in view of a total thermal energy corresponding to a sum of the uninterruptible thermal energy consumption of the first load of the thermal load given in the forecast energy demand and thermal energy consumption of the second load of the thermal load, the third load of the thermal load, and the fourth load of the thermal load, and another total thermal energy corresponding to a sum of a thermal energy supply from the CHP and a thermal energy supply from the thermal energy supply system.

9. The control device of claim 8, wherein the RES is configured to exploit natural energy for thermal energy output and the total thermal energy is inclusive of a thermal energy supply from the RES.

10. A method comprising:
receiving, at a control device of an electric and thermal energy network, a forecast energy demand, a unit energy price, and a forecast weather condition for a geographical region covered by the electric and thermal energy network, wherein the electric and thermal energy network includes a combined head and power system (CHP), a renewable energy source (RES), an electric storage unit, a thermal accumulation unit, an electric power grid, a thermal energy supply system, an electric load, and a thermal load;
repeatedly generating, at the control device, two or more energy balance candidates for each unit time for an output of the electric power grid and an output of the thermal accumulation unit based on combinations of values of an output ratio of the CHP, an output ratio of the RES, an output ratio of the thermal energy supply system, an output ratio of the electric storage unit, a consumption ratio of the electric load, and a consumption ratio of the thermal load, until convergence of evaluation values of the two or more energy balance candidates reaches a predetermined convergence criterion, wherein repeatedly generating the two or more energy balance candidates comprises:
calculating, at the control device, an output of the CHP from a rated output of the CHP and the output ratio of the CHP;
calculating, at the control device, an output of the RES from a maximum output of the RES and the output ratio of the RES, the maximum output of the RES based on a weather condition;
calculating, at the control device, an output of the thermal energy supply system from a rated output of the thermal energy supply system and the output ratio of the thermal energy supply system;
calculating, at the control device, an output of the electric storage unit from a maximum output of the electric storage unit and the output ratio of the electric storage unit, the maximum output of the electric storage unit based on a state of charge;
calculating, at the control device, an energy consumption of the electric load from a rated power consumption of the electric load and the consumption ratio of the electric load;
calculating, at the control device, an energy consumption of the thermal load from a rated power consumption of the thermal load and the consumption of the thermal load;
calculating, at the control device, a difference between a first sum and a second sum as the output of the electric power grid and the output of the thermal accumulation unit, the first sum between the output of the CHP, the output of the RES, the output of the thermal energy supply system, and the output of the electric storage unit, the second sum between an uninterruptible energy consumption demand, the energy consumption of the electric load, and the energy consumption of the thermal load;
evaluating, at the control device, an evaluation criterion with energy supply costs, $CO_2$ emissions, and primary energy consumptions as inputs to evaluate the two or more energy balance candidates for each unit time, the energy supply costs based on the unit energy price, the evaluation criterion comprising a summing of rankings of the energy supply costs, the CO2 emissions, and the primary energy consumptions; and selecting, at the control device from the two or more energy balance candidates for each unit time, a most positive evaluation candidate that is most positively evaluated when the convergence of the evaluation values of the two or more candidates has reached the predetermined convergence criterion; and transmitting, from the control device to the CHP, the RES, the thermal energy supply system, the electric storage unit, the electric load, and the thermal load, respective operational instructions based on the most positive evaluation candidate, the operational instructions for each unit time to instruct the CHP, the RES, the thermal energy supply system, the electric storage unit, the electric load, and the thermal load to control the output ratio of the CHP, the output ratio of the RES, the output ratio of the thermal energy supply system, the output ratio of the electric storage unit, the consumption ratio of the electric load, and the consumption ratio of the thermal load.

11. The method of claim 10, further comprising summing the rankings of the energy supply costs, the CO2 emissions, and the primary energy consumptions.

12. The method of claim 10, wherein repeatedly generating the two or more energy balance candidates further comprises generating and selecting the two or more energy balance candidates using a genetic algorithm.

13. The method of claim 12, wherein using the genetic algorithm comprises coding the output ratio of the CHP, the output ratio of the RES, the output ratio of the thermal energy supply system, the output ratio of the electric storage unit, the consumption ratio of the electric load, and the consumption ratio of the thermal load into a chromosome of the genetic algorithm, the chromosome having a predetermined number of genes.

14. The method of claim 13, wherein using the genetic algorithm further comprises performing a crossover operation, a mutation operation, or both, on one or more chromosomes.

15. The method of claim 14, wherein the genetic algorithm is executed until the two or more energy balance candidates satisfy a convergence criteria or a number of generations has reached a repetition count.

16. The method of claim 10, further comprising:
receiving, at the control device, an electric power exchange profile of the electric power grid as an energy demand; and
matching the output of the electric power grid and the electric power exchange profile as an additional evaluation criterion.

17. The method of claim 10, further comprising classifying, at the control device, loads of the electric load, the thermal load, or both as non-adjustable loads, interruptible and adjustable loads, manageable loads that are not allowed to discontinue operation until a total operation time is reached, or manageable loads that are allowed to discontinue operation if a total operation time is reached within a predetermined period of time.

18. A non-transitory, computer-readable storage device storing instructions that, when executed by a processor, cause the processor to perform operations comprising:
receiving, at a control device of an electric and thermal energy network, a forecast energy demand, a unit energy price, and a forecast weather condition for a geographical region covered by the electric and thermal energy network, wherein the electric and thermal energy network includes a combined head and power system (CHP), a renewable energy source (RES), an electric storage unit, a thermal accumulation unit, an electric power grid, a thermal energy supply system, an electric load, and a thermal load;
repeatedly generating, at the control device, two or more energy balance candidates for each unit time for an output of the electric power grid and an output of the thermal accumulation unit based on combinations of values of an output ratio of the CHP, an output ratio of the RES, an output ratio of the thermal energy supply system, an output ratio of the electric storage unit, a consumption ratio of the electric load, and a consumption ratio of the thermal load, until convergence of evaluation values of the two or more energy balance candidates reaches a predetermined convergence criterion, wherein repeatedly generating the two or more energy balance candidates comprises:
calculating, at the control device, an output of the CHP from a rated output of the CHP and the output ratio of the CHP;
calculating, at the control device, an output of the RES from a maximum output of the RES and the output ratio of the RES, the maximum output of the RES based on a weather condition;
calculating, at the control device, an output of the thermal energy supply system from a rated output of the thermal energy supply system and the output ratio of the thermal energy supply system;
calculating, at the control device, an output of the electric storage unit from a maximum output of the electric storage unit and the output ratio of the electric storage unit, the maximum output of the electric storage unit based on a state of charge;
calculating, at the control device, an energy consumption of the electric load from a rated power consumption of the electric load and the consumption ratio of the electric load;
calculating, at the control device, an energy consumption of the thermal load from a rated power consumption of the thermal load and the consumption of the thermal load;
calculating, at the control device, a difference between a first sum and a second sum as the output of the electric power grid and the output of the thermal accumulation unit, the first sum between the output of the CHP, the output of the RES, the output of the thermal energy supply system, and the output of the electric storage unit, the second sum between an uninterruptible energy consumption demand, the energy consumption of the electric load, and the energy consumption of the thermal load;
evaluating, at the control device, an evaluation criterion with energy supply costs, CO2 emissions, and primary energy consumptions as inputs to evaluate the two or more energy balance candidates for each unit time, the energy supply costs based on the unit energy price, the evaluation criterion comprising a summing of rankings of the energy supply costs, the CO2 emissions, and the primary energy consumptions; and
selecting, at the control device from the two or more energy balance candidates for each unit time, a most positive evaluation candidate that is most positively evaluated when the convergence of the evaluation values of the two or more candidates has reached the predetermined convergence criterion; and initiating transmission, from the control device to the CHP, the RES, the thermal energy supply system, the electric storage unit, the electric load, and the thermal load, of respective operational instructions based on the most positive evaluation candidate, the operational instructions for each unit time to instruct the CHP, the RES, the thermal energy supply system, the electric storage unit, the electric load, and the thermal load to control the output ratio of the CHP, the output ratio of the RES, the output ratio of the thermal energy supply system, the output ratio of the electric storage unit, the consumption ratio of the electric load, and the consumption ratio of the thermal load.

19. The non-transitory computer-readable storage device of claim 18, wherein operations further comprise summing the rankings of the energy supply costs, the $CO_2$ emissions, and the primary energy consumptions.

20. The non-transitory computer-readable storage device of claim 18, wherein the operations further comprise classifying, at the control device, loads of the electric load, the thermal load, or both as non-adjustable loads, interruptible and adjustable loads, manageable loads that are not allowed to discontinue operation until a total operation time is reached, or manageable loads that are allowed to discontinue operation if a total operation time is reached within a predetermined period of time.

* * * * *